US011860825B2

(12) United States Patent
Yang et al.

(10) Patent No.: US 11,860,825 B2
(45) Date of Patent: *Jan. 2, 2024

(54) COLLABORATIVE DOCUMENT ACCESS RECORDING AND MANAGEMENT

(71) Applicant: Google LLC, Mountain View, CA (US)

(72) Inventors: Allen Yang, New York, NY (US); Clayton Williams, New York, NY (US); James Zoll, Jersey City, NJ (US); Andrea Dulko, Brooklyn, NY (US); Matthew Pearson-Beck, New York, NY (US); Blake Robert VanLandingham, Kew Gardens, NY (US); Chi Ho Chun, New York, NY (US); Tianlei Tang, Hoboken, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/202,236

(22) Filed: Mar. 15, 2021

(65) Prior Publication Data

US 2021/0200719 A1   Jul. 1, 2021

Related U.S. Application Data

(63) Continuation of application No. 15/730,512, filed on Oct. 11, 2017, now Pat. No. 10,949,396.

(51) Int. Cl.
*G06F 16/176* (2019.01)
*G06F 16/11* (2019.01)
(Continued)

(52) U.S. Cl.
CPC .......... *G06F 16/176* (2019.01); *G06F 16/122* (2019.01); *G06F 16/1734* (2019.01);
(Continued)

(58) Field of Classification Search
CPC .. G06F 16/176; G06F 16/122; G06F 16/1734; G06F 16/182; G06F 40/166;
(Continued)

(56) References Cited

U.S. PATENT DOCUMENTS 9,367,646 B2   6/2016   Branton
9,529,916 B1   12/2016  Barguno
(Continued)

FOREIGN PATENT DOCUMENTS

| CN | 103907110 A | 7/2014 |
| CN | 103970544 A | 8/2014 |
| CN | 105528553 A | 4/2016 |

OTHER PUBLICATIONS

International Search Report and Written Opinion dated Sep. 11, 2018 for International Application PCT/JS2018/043766, International Filing Dale Jul. 25, 2018, 12 pages.
(Continued)

*Primary Examiner* — Jennifer N Welch
*Assistant Examiner* — Kuang F Chen
(74) *Attorney, Agent, or Firm* — Lowenstein Sandler LLP

(57) ABSTRACT

A method of providing user access history for a collaborative document includes receiving, by a server, a first request for the collaborative document from a client device of a user of a plurality of users that have permission to access the collaborative document; providing the collaborative document to the client device for presentation to the user in a user interface on the client device; determining whether a collaborator type of the user matches a predefined collaborator type; responsive to determining that the collaborator type of the user matches the predefined collaborator type: creating a first user access history for the collaborative document based on accesses of the collaborative document by one or more of the plurality of users, and providing the first user access
(Continued)

history for the collaborative document to the client device for display within a consolidated view of the user interface presenting the collaborative document.

17 Claims, 30 Drawing Sheets

(51) Int. Cl.
| | |
|---|---|
| *G06F 16/182* | (2019.01) |
| *G06F 16/17* | (2019.01) |
| *H04L 51/046* | (2022.01) |
| *G06Q 10/107* | (2023.01) |
| *G06Q 10/10* | (2023.01) |
| *G06F 40/166* | (2020.01) |
| *H04L 51/216* | (2022.01) |

(52) U.S. Cl.
CPC .......... *G06F 16/182* (2019.01); *G06F 40/166* (2020.01); *G06Q 10/10* (2013.01); *G06Q 10/107* (2013.01); *H04L 51/046* (2013.01); *H04L 51/216* (2022.05)

(58) Field of Classification Search
CPC .... G06Q 10/10; G06Q 10/107; H04L 51/046; H04L 51/16
See application file for complete search history.

(56) References Cited

U.S. PATENT DOCUMENTS

| | | | |
|---|---|---|---|
| 10,691,877 B1* | 6/2020 | Eisner | G06Q 10/101 |
| 2011/0276925 A1 | 11/2011 | Tumanov et al. | |
| 2013/0185252 A1 | 1/2013 | Palmucci | |
| 2014/0289645 A1 | 9/2014 | Megiddo et al. | |
| 2016/0088101 A1 | 3/2016 | Batiste et al. | |
| 2016/0099949 A1* | 4/2016 | Leondires | G06F 21/6218 726/28 |
| 2016/0292289 A1 | 10/2016 | Milvaney et al. | |
| 2017/0139550 A1 | 5/2017 | Milvaney et al. | |
| 2017/0228393 A1 | 8/2017 | Fay et al. | |
| 2017/0257406 A1 | 9/2017 | Wilde et al. | |
| 2018/0335935 A1* | 11/2018 | Larson | G06F 40/166 |

OTHER PUBLICATIONS

Unknown. "Monitor team sharing activity"_ DropBox. https://www.dropbox.com/help/business/monitor-sharing-activity. etrieved on Oct. 11, 2017. 7 pages.

Office Action for China Patent Application No. 201880066578.3, dated Feb. 12, 2023, 34 pages.

* cited by examiner

COLLABORATIVE DOCUMENT ACCESS RECORDING AND MANAGEMENT

CROSS-REFERENCE TO RELATED APPLICATIONS

The present application is a continuation of application Ser. No. 15/730,512, filed Oct. 11, 2017, entitled "COLLABORATIVE DOCUMENT ACCESS RECORDING AND MANAGEMENT," now U.S. Pat. No. 10,949,396 B2, which is incorporated by reference herein.

TECHNICAL FIELD

Aspects and implementations of the present disclosure relate to electronic documents, and more specifically, to collaborative document access recording and management.

BACKGROUND

During development of an electronic document, it is often desirable to have multiple reviewers read, comment, and/or edit a draft of the electronic document. For example, an author may create an initial draft of an electronic document and send a copy of the electronic document to multiple reviewers. In some instances, the author and/or the reviewers may not be aware of which of the reviewers have already accessed the electronic document. As such, a first reviewer may be waiting on a second reviewer to access the electronic document when the second reviewer has already accessed the electronic document. Further, without such access information, there may not be a straight-forward and/or efficient way to contact the reviewers that have accessed or have not accessed the electronic document.

SUMMARY

Aspects and implementations of the present disclosure improve collaborative document access recording and management technology by recording access data including when a user has accessed a collaborative document and the time of such an access. The access data may be obtained without using a third-party tracker and may be stored in a cloud-based environment providing the collaborative document. The technology can provide a consolidated view identifying users that have accessed and have not accessed a collaborative document. Also, the consolidated view can display available actions corresponding to the users. The available actions may include, for example, sending a message to a user that has accessed or has not accessed the collaborative document, requesting review from a user that has accessed or has not accessed the collaborative document, etc. In one implementation, the consolidated view may be presented in a user interface (UI) that is also displaying the collaborative document. As such, the performance of the UI may be enhanced because there may not be transitions between different UIs. Additionally, the user experience may be enhanced by a more user-friendly UI.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
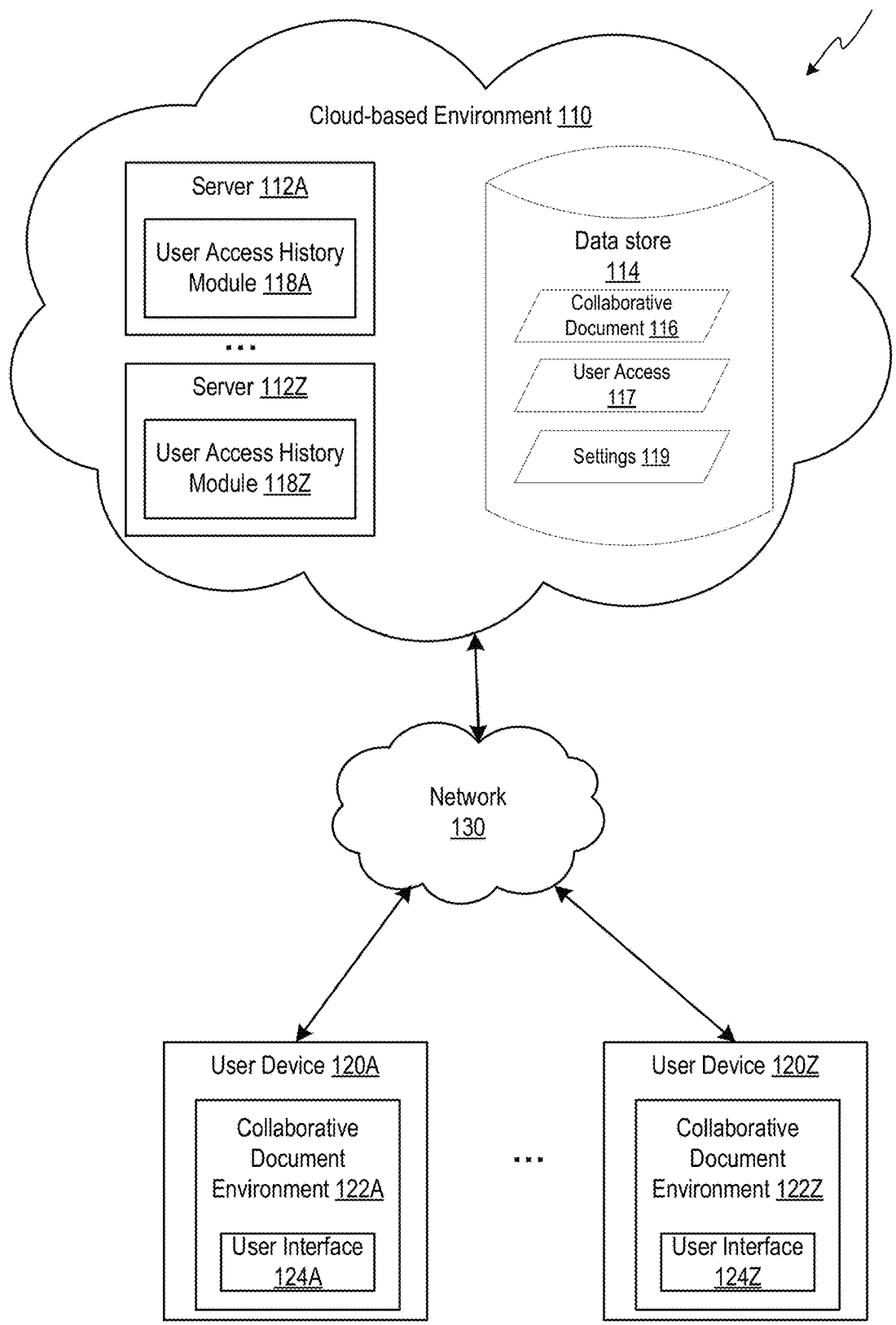
FIG. 1 illustrates an example of a system architecture for implementations of the present disclosure.

Collaborative document systems may allow an electronic document owner to invite other users to join as collaborators with respect to an electronic document stored in a cloud-based environment. An electronic document refers to media content used in electronic form. Media content may include text, tables, videos, images, graphs, slides, charts, software programming code, designs, lists, plans, blueprints, maps, etc. An electronic document to which users have been granted permission to access and/or edit concurrently may be referred to as a collaborative document herein. The collaborative document may be provided to user devices of the collaborators by one or more servers in a cloud-based environment. Each collaborator may be associated with a user type (e.g., editor, reviewer, viewer, etc.). Different views and capabilities may be provided to the collaborators based on their user type to enable editing, commenting on, reviewing, or simply viewing the collaborative document. Once granted permission to access the collaborative document, the collaborators may access the collaborative document to perform operations allowed for their user type.

Conventionally, the user access history of a collaborative document is not recorded and displayed. Additionally, some systems may use separate user interfaces (UIs) for displaying an electronic document and certain recorded data, which may degrade performance of the system by switching between UIs. Systems may also use third-party trackers (e.g., a file placed on a user computer (in a browser) by a server of a system when the user accesses the system, and the file has a domain of the third-party that records use of the system) to record desired data, thereby adding a separate connection point from which to retrieve data in a network and degrading performance of the system.

Aspects and implementations of the present disclosure are directed to a collaborative document system that addresses at least these deficiencies, among others, by recording and managing user access history of collaborative documents. User access history may provide an author and/or collaborators of a collaborative document with various insights by viewing when others have accessed the collaborative document. For example, a senior employee in an organization may be waiting on a junior employee to access the collaborative document, or vice versa, prior to accessing the document. Displaying the user access history to the employees may aid in reducing desired changes being undone and/or change conflicts between versions of the collaborative document. Additionally, providing the user access history may result in a more streamlined process for collaborators to develop, edit, review, and/or view a collaborative document.

In one implementation, a collaborative document may be shared with one or more users (e.g., collaborators). As noted above, the users may have various user types, such as editor, reviewer, or viewer. Editors may access the collaborative document to make changes to the collaborative document, reviewers may access the document to suggest changes or make comments in the collaborative document, and viewers may access the document to view the collaborative document. These accesses may be collected and recorded as user access data by servers in a cloud-based environment providing the collaborative document, without the use of a third-party tracker. User access data may include the users that access (e.g., view) the collaborative document and the time at which the users access the collaborative document.

The user access history may be created based on the user access data and may be provided for display in a user interface that may also be presenting the collaborative document on a user device. The user access history may be displayed in a consolidated view that shows the users that have permission to access the collaborative document and an indication of whether the users have accessed or have not accessed the collaborative document, and times of user accesses. Also, the consolidated view may include available actions (e.g., sending a message, requesting review, alerting to an update) corresponding to the users in the user access history.

In an implementation, users having a certain user type (e.g., editor) may be allowed to view the user access history for users with permissions to access the collaborative document, while users without that certain user type cannot view the user access history. In another implementation, a user that has permission to access a collaborative document or that uses the collaboration document system can manage their privacy settings by disabling user access history from being recorded at an individual collaborative document level and/or at a global collaborative document level. Further, the users in the user access history may be grouped based on group metadata to organize the information presented in the consolidated view. For example, users of certain teams or departments in an organization may be grouped into different groups.

In one implementation, the consolidated view may be displayed as an overlay on a portion of the collaborative document also being presented in the UI. Displaying the user access history in the same UI as the collaborative document may improve processing of the collaborative document system due to fewer transitions between a UI solely displaying the collaborative document and a UI solely displaying the user access history. Further, network traffic may be reduced because repeated requests and/or responses may be eliminated for transitioning between UIs displaying the collaborative document and the user access history individually. The consolidated view of the user access history may also enhance the UI by conveniently providing useful information and actionable options in the UI without transitioning to a separate UI. As a result, user experience with the UI may be improved.

FIG. 1 illustrates an example of a system architecture 100 for implementations of the present disclosure. The system architecture 100 includes a cloud-based environment 110 connected to user devices 120A-120Z via a network 130. A cloud-based environment 110 refers to a collection of physical machines that host applications providing one or more services (e.g., collaborative document access) to multiple user devices 120 via a network 130. The network 130 may be public networks (e.g., the Internet), private networks (e.g., a local area network (LAN) or wide area network (WAN)), or a combination thereof. Network 130 may include a wireless infrastructure, which may be provided by one or more wireless communications systems, such as a wireless fidelity (WiFi) hotspot connected with the network 130 and/or a wireless carrier system that can be implemented using various data processing equipment, communication towers, etc. Additionally or alternatively, network 130 may include a wired infrastructure (e.g., Ethernet).

The cloud-based environment 110 may include one or more servers 112A-112Z and a data store 114. The data store 114 may be separate from the servers 112A-112Z and communicatively coupled to the servers 112A-112Z or the data store 114 may be part of one or more of the servers 112A-112Z. The data store 114 may store a collaborative document 116. The collaborative document 116 may be a spreadsheet document, a slideshow document, word processing document, or any suitable electronic document (e.g., an electronic document including text, tables, videos, images, graphs, slides, charts, software programming code, designs, lists, plans, blueprints, maps, etc.) that can be shared with users.

The collaborative document 116 may be created by an author and the author may share the collaborative document 116 with other users (e.g., collaborators). Sharing the collaborative document 116 may refer to granting permission to the other users to access the collaborative document 116. Sharing the collaborative document 116 may include informing the other users of the collaborative document 116 via a message (e.g., email) including a link to the collaborative document 116. The level of permissions that each user is granted may be based on the user type of each particular user. For example, a user with an editor user type may be able to open the collaborative document 116 and make changes directly to the collaborative document 116. Whereas a user with a reviewer user type may make comments to suggest changes in the collaborative document 116.

The servers 112A-112Z may be physical machines (e.g., server machines, desktop computers, etc.) that each include one or more processing devices communicatively coupled to memory devices and input/output (I/O) devices. One or more of the servers 112A-112Z may provide a collaborative document environment 122A-122Z to the user devices 120A-120Z. The server 112A-112Z selected to provide the collaborative document environment 122A-122Z may be based on certain load-balancing techniques, service level agreements, performance indicators, or the like. The collaborative document environment 122A-122Z may enable users using different user devices 120A-120Z to simultaneously access the collaborative document 116 to review, edit, view, and/or propose changes to the collaborative document 116 in a respective user interface 124A-124Z that presents the collaborative document 116. In an implementation, the user interfaces 124A-124Z may be web pages rendered by a web browser and displayed on the user device 120A-120Z in a web browser window. In another implementation, the user interfaces 124A-124Z may be included in a stand-alone application downloaded to the user device 120A-120Z.

The user devices 120A-120Z may include one or more processing devices communicatively coupled to memory devices and I/O devices. The user devices 120A-120Z may be desktop computers, laptop computers, tablet computers, mobile phones (e.g., smartphones), or any suitable computing device. A user that is invited and becomes a collaborator of the collaborative document 116 may request to access the collaborative document 116. As such, the user device 120A associated with the user may request the collaborative document 116 from the cloud-based environment 110. In one implementation, the request may include user access data 117, such as the user that accessed the collaborative document 116 and the time of the access. The user access data 117 may be stored in the data store 114. One of the servers 112A-112Z may provide the collaborative document 116 to the requesting user device 112A for display in the user interface 122A. In one implementation, when the user device 120A accesses the collaborative document 116 (e.g., by viewing), the user device 120A may transmit a file read receipt to the cloud-based environment 110. The file read receipt may include the user access data 117, and the user access data 117 may be stored in the data store 114.

Further, the collaborative document environment 122A-122Z may provide users with certain privacy settings for controlling whether their access history may be viewed for the collaborative document 116 and/or other collaborative documents. For example, a user may explicitly decline having their access history displayed for the collaborative document 116 and/or any collaborative documents. The user device 120A may transmit one or more settings 119 (e.g., global access history setting, document level access history setting) to the cloud-based environment 110 for storage in the data store 114.

Each of the servers 112A-112Z may host a user access history module (118A-118Z). The user access history modules 118A-118Z may be implemented as computer instructions that are executable by one or more processing devices on each of the servers 112A-112Z. The user access history modules 118A-118Z may receive a request for the user access history for the collaborative document 116. The user access history modules 116A-116Z may create the user access history using the user access data 117 by identifying the users with permission to access the collaborative document 116 and determining times of when the users accessed the collaborative document 116. The user access history modules 116A-116Z may exclude, based on the settings 119, user access data 117 for users that have not consented to allowing their access history from being shown.

The user access history may be provided to the requesting user device 120A for display in the user interface 124A presenting the collaborative document 116. In an implementation, the user access history may be displayed over a portion of the collaborative document 116 in the user interface 124A. The user access history may be displayed in a consolidated view that specifies the users with permission to access the collaborative document 116, the indication of when the user accessed the collaborative document 116 or an indication of if the user has not accessed the collaborative document 116, and one or more actions corresponding to the user. For example, one action may include sending a message to the user, and the viewer can initiate this action from the consolidated view in the user interface 124A. Also, as discussed below, the users may be grouped into groups in the consolidated view based on group metadata included in the user access history.

The user access history may be provided to users with certain user types (e.g., editors) and may be blocked from presentation to users having other user types (e.g., non-editors). Additionally, users may be eligible to see the user access history based on a type of account that is associated with the collaborative document environment 122A. For example, one type of account may include a premium account that is eligible for viewing the user access history. Other types of accounts may include a basic account and a consumer account that are not eligible for viewing the user access history.

Figure 2:
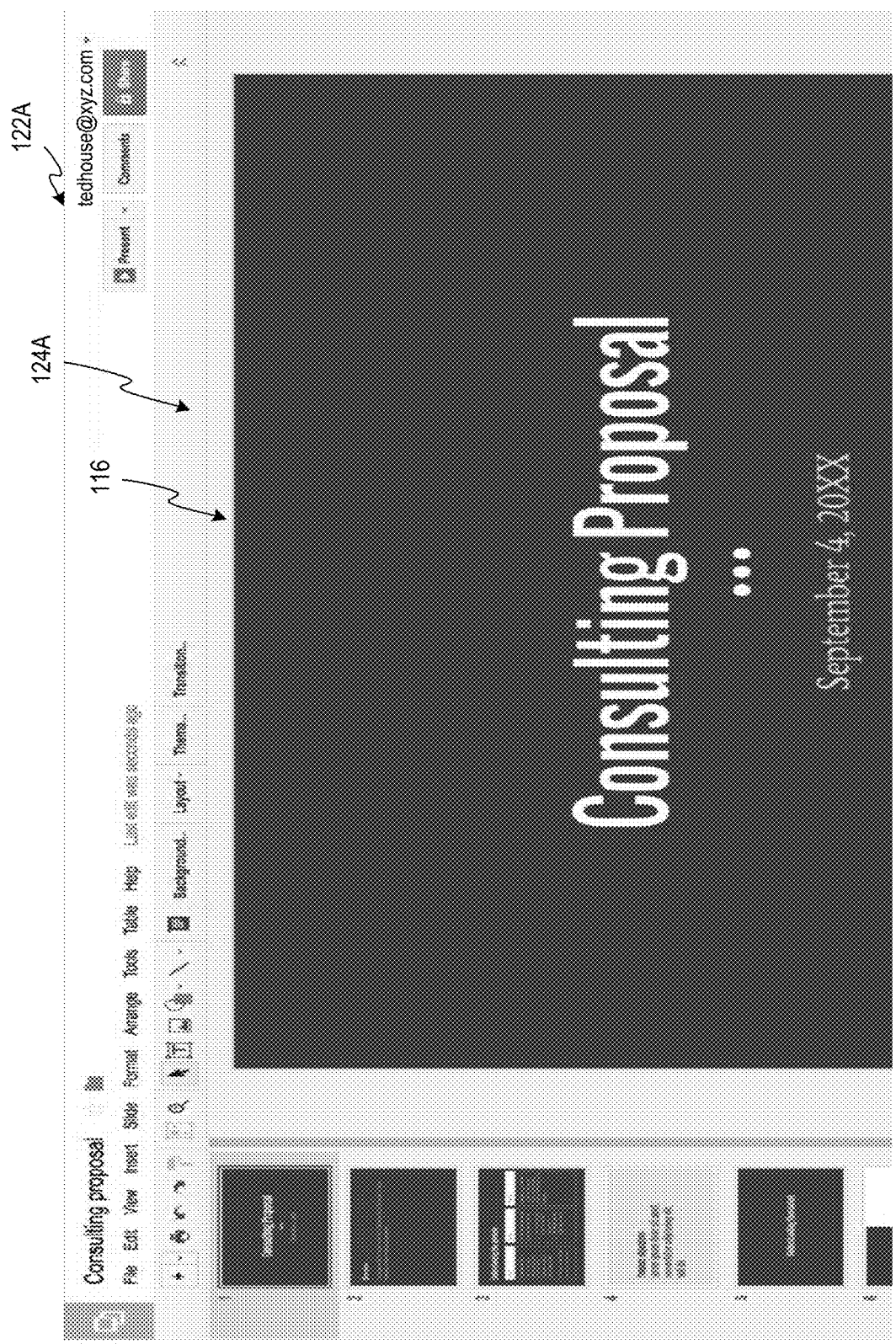
FIG. 2 illustrates an example user interface presenting a collaborative document, in accordance with one implementation of the disclosure.

FIG. 2 illustrates an example user interface presenting a collaborative document 116, in accordance with one implementation of the disclosure. Although the collaborative document 116 includes a slideshow document as an example, it should be understood that the user access history techniques of the disclosure may be applied to a spreadsheet document, word-processing document, or any suitable collaborative document. The collaborative document 116 is displayed in user interface 124A of a collaborative document environment 122A on a user device 120A. The collaborative document 116 may have been created by an author/owner who shared the collaborative document 116 with other users. Alternatively, an author may share the collaborative document 116 with a domain or a group of users and any users in that domain or group may be granted permission to access the collaborative document 116. The users that are granted permission to access the collaborative document 116 may each request and access the collaborative document 116 on respective user devices 120A-120Z. For example, the user, "Ted House," may have accepted an invitation to join as a collaborator of the collaborative document 116. The user may then request to access the collaborative document 200 via an input selection in the collaborative document environment 122A, which is further described with respect to FIG. 3

Figure 3:
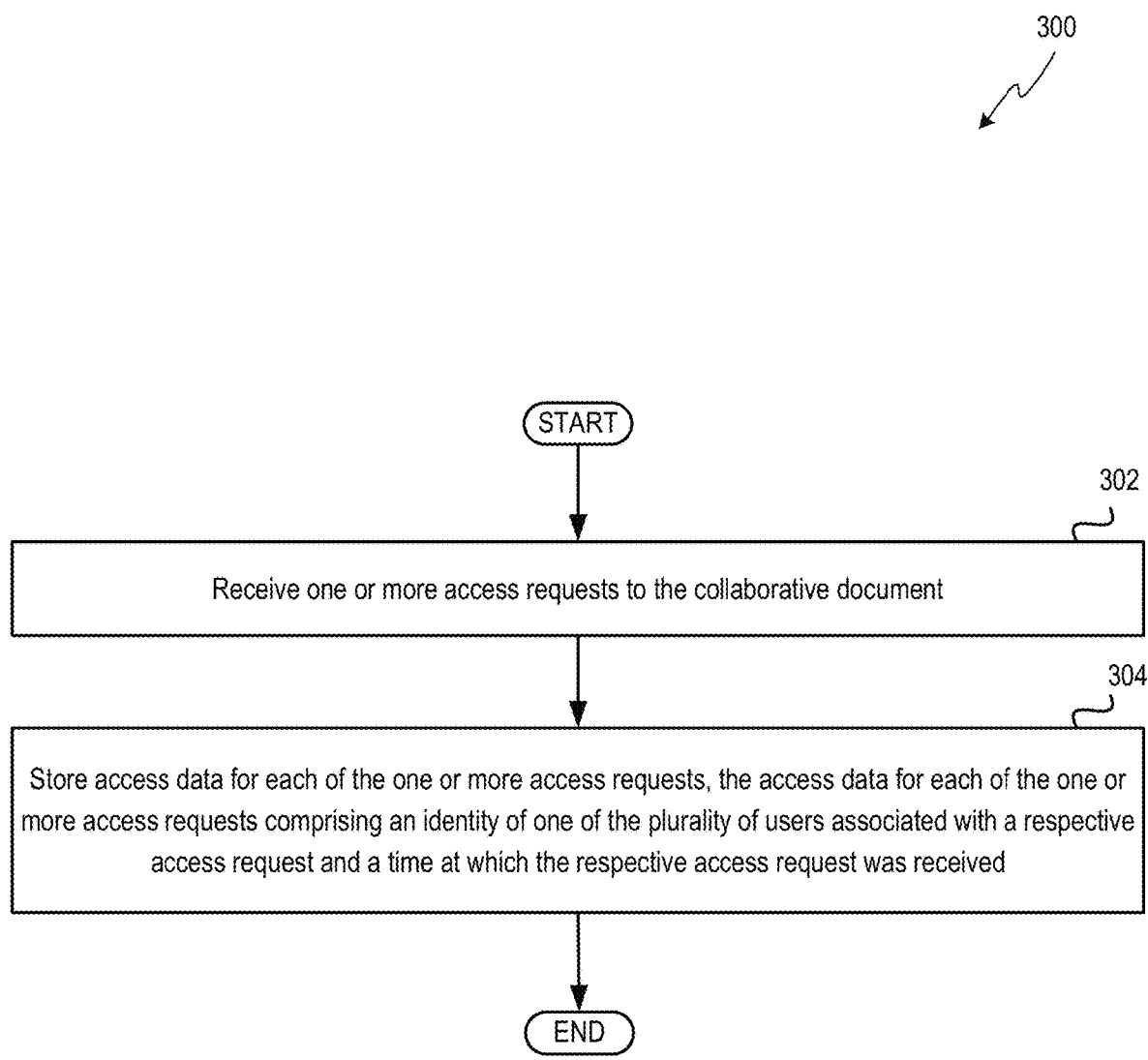
FIG. 3 depicts a flow diagram of aspects of a method for storing access data in a cloud-based environment, in accordance with one implementation of the disclosure.

FIG. 3 depicts a flow diagram of aspects of a method 300 for storing user access data 117 in the cloud-based environment 110, in accordance with one implementation of the disclosure. Method 300 and each of its individual functions, routines, subroutines, or operations may be performed by one or more processing devices of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by one or more user access history modules 118A-118Z executed by one or more processing devices of the servers 112A-112Z in the cloud-based environment 110.

Method 300 may begin at block 302. At block 302, the processing device may receive one or more access requests to the collaborative document 116. The access requests may be received from one or more user devices 120A-120Z and may each include certain access data 117, such as an identity of the user associated with a respective access request and a timestamp (date/time) at which the respective access request was made. In an implementation, the user devices 120A-120Z that access (e.g., open the collaborative document 116 for viewing) the collaborative document 116 may transmit a file read receipt to the cloud-based environment and the file read receipt may include the access data 117.

At block 304, the processing device may store the access data 117 for each of the one or more access requests or for the file read receipt in the data store 114. Further, the processing device may provide the collaborative document 116 to be presented in the one or more user interfaces 124A-124Z of the requesting user devices 120A-120Z.

Figure 4:
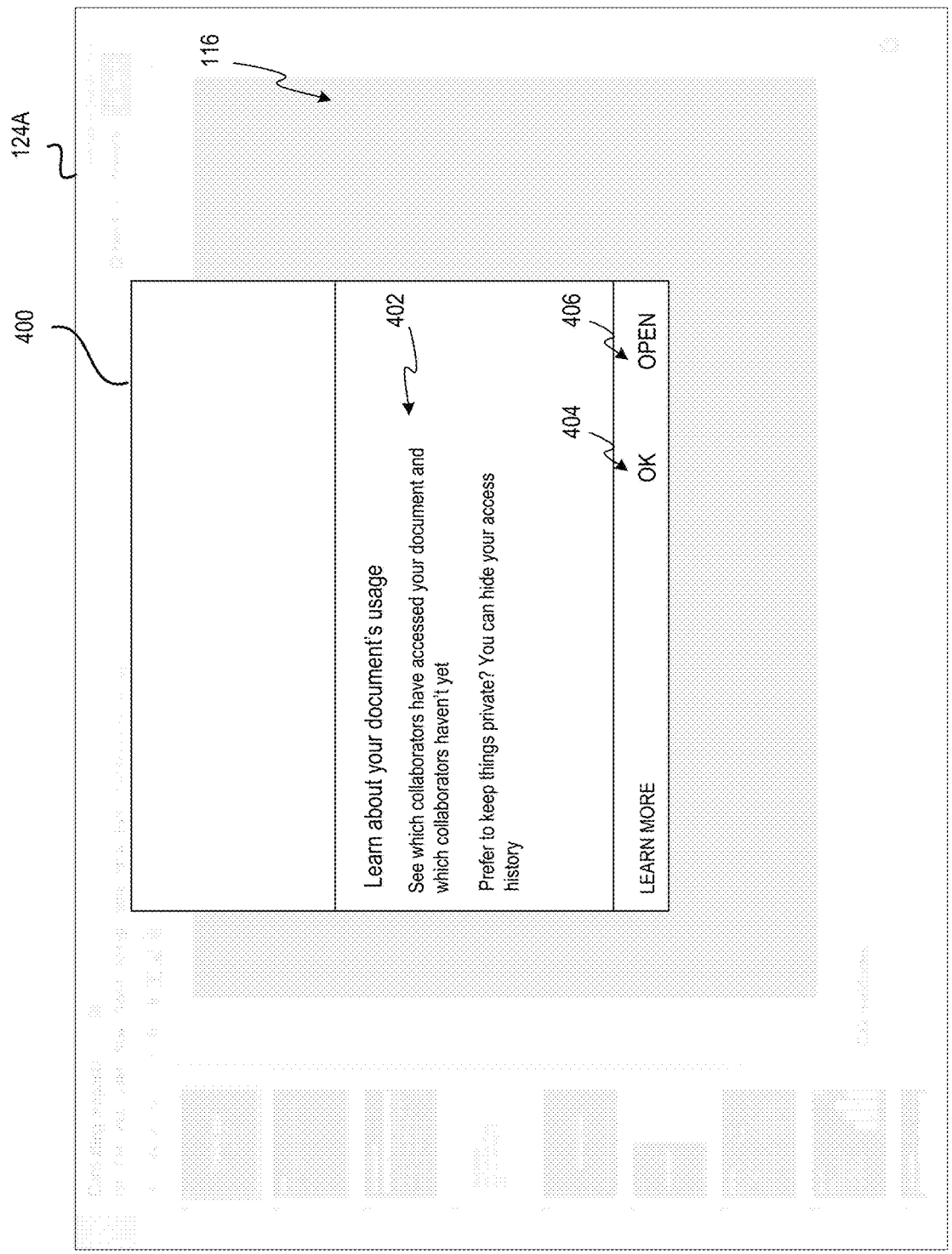
FIG. 4 illustrates an example of an informational view displayed when an editor accesses the collaborative document, in accordance with one implementation of the disclosure.

FIG. 4 illustrates an example of an informational view 400 displayed when an editor accesses the collaborative document 116, in accordance with one implementation of the disclosure. The informational view 400 may include a promotional message 402 that appears in the user interface 124A with the collaborative document 116 when the editor first accesses the collaborative document 116. Since editors may be allowed to view the user access history for the collaborative document 116, the promotional message 402 may inform the editor that they can see which collaborators have accessed their collaborative document 116 and which collaborators have not yet accessed the collaborative document 116. Further, the promotional message 402 may inform the editor that they can hide their access history if they so prefer. In an example, a link may be provided to various privacy settings views described below with respect to FIGS. 17A-20. If the user desires to close the informational view 400, the user may select the "OK" button 404, and the user interface 124A may remove the informational view 400 and display just the collaborative document 116. If the user desires to view the user access history for the collaborative document 116, the user may select the "OPEN" button 406, and the user interface 124A may display the user access history, as described herein. In an implementation, the "OPEN" button 406 may be referred to as a visual indicator.

Figure 5:
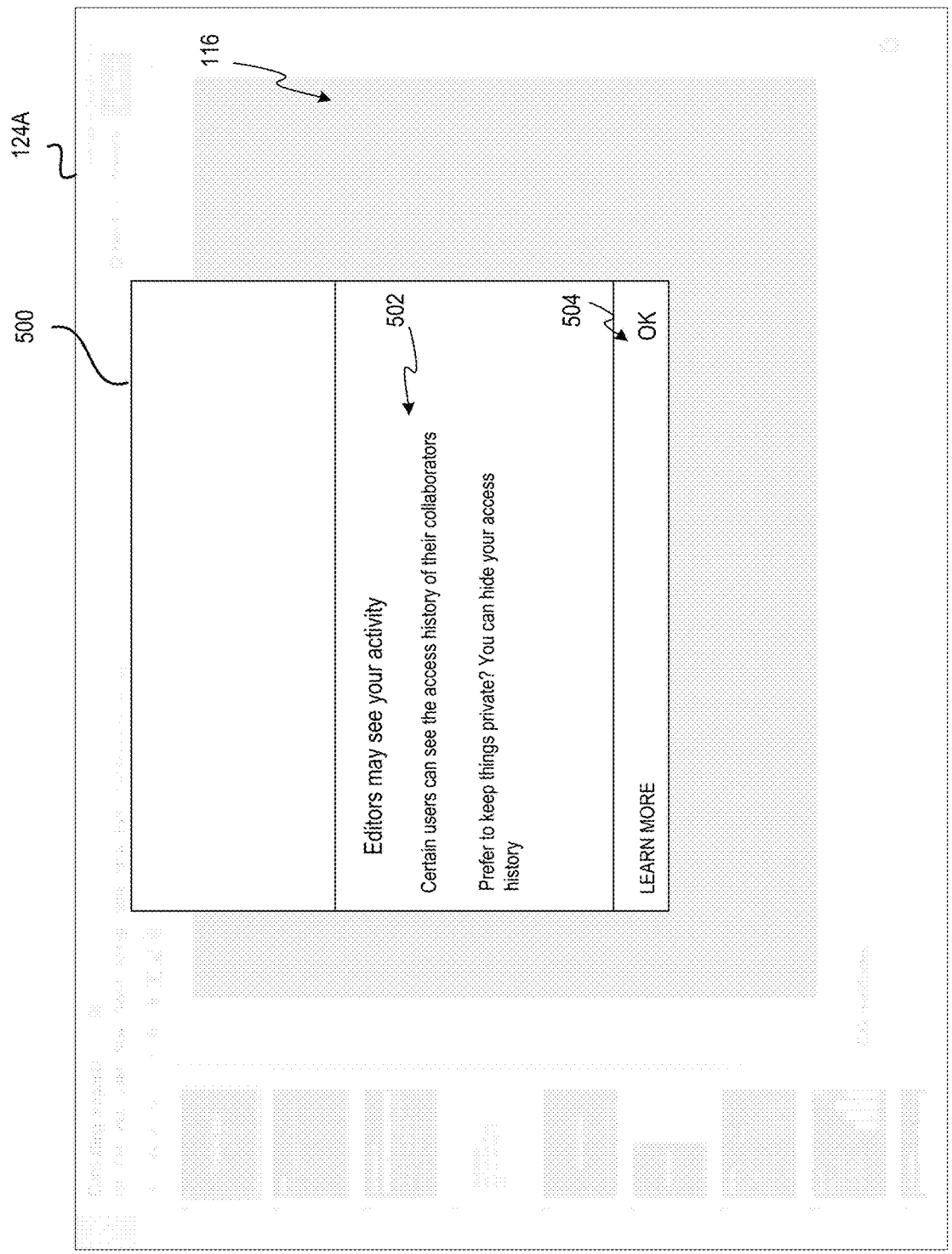
FIG. 5 illustrates another example of an informational view displayed when a non-editor accesses the collaborative document, in accordance with one implementation of the disclosure.

FIG. 5 illustrates another example of an informational view 500 displayed when a non-editor (e.g., viewer, reviewer) accesses the collaborative document 116, in accordance with one implementation of the disclosure. The informational view 500 may include a promotional message 502 that appears when the non-editor first accesses the collaborative document 116. Since non-editors may not be allowed to view the user access history for the collaborative document 116, the promotional message 502 may inform the non-editor that certain users can see the user access history of the collaborators for the collaborative document 116. Further, promotional message 502 may inform the editor that they can hide their access history if they so prefer. In an example, a link may be provided to various privacy settings views described below with respect to FIGS. 17A-20. If the user desires to close the informational view 500, the user may select the "OK" button 504, and the user interface 124A may remove the informational view 500 and display just the collaborative document 116.

Figure 6:
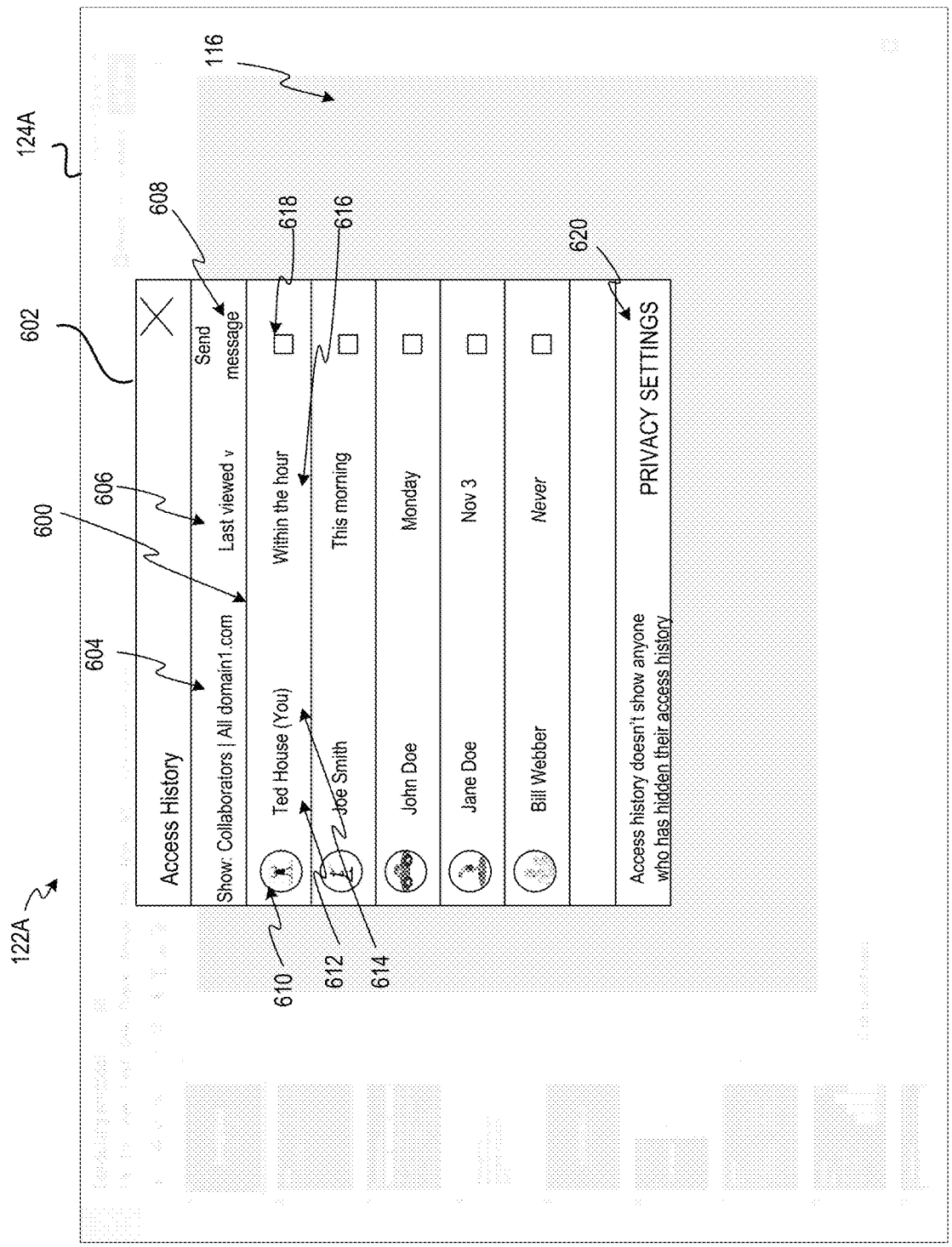
FIG. 6 illustrates an example of user access history displayed in a user interface presenting the collaborative document, in accordance with one implementation of the disclosure.

FIG. 6 illustrates an example of user access history 600 displayed in a user interface 124A presenting the collaborative document 116, in accordance with one implementation of the disclosure. As depicted, the user access history 600 may be displayed in a consolidated view 602 in the user interface 124A. In one example, the consolidated view 602 may be overlaid over a portion of the user interface 124A displaying the collaborative document 116. The user interface 124A may use certain techniques, such as blurring or masking, that can be applied to the underlying collaborative document 116 to draw attention to the consolidated view 602, which is in focus. As should be noted, the collaborative document environment 122A may not transition to a different UI to display the user access history 600, which may enhance performance of the collaborative document environment 122A and network 130. Further, displaying the user access history 600 in the consolidated view 602 together with the collaborative document 116 in the same user interface 124A may enhance the user experience with the collaborative document environment 122A by conveniently placing desired information and providing a more seamless experience.

The consolidated view 602 may include headers for the collaborators (604) granted permission to access the collaborative document 116, when the collaborative document 116 was last viewed (606), and an action (e.g., send message) (608) corresponding to the users. The user may sort (ascending/descending) the user access history by any of the headers. For example, the user access history 600 is sorted in descending order by the header associated with when the collaborative document 116 was last viewed (606).

Additionally, there may be different domains that each include users or groups of users with permissions to access the collaborative document 116. As such, the user may select the domain for which the user access history 600 is displayed. In the depicted example, the user access history 600 is displayed for collaborators in the "domain1.com". In another example, the user access history 600 may be displayed for any user, either within a domain or outside a domain, that has permission to access the collaborative document 116.

The user access history 600 may display access history for users that have not explicitly declined to allow their access history for the collaborative document 116 or for any collaborative document to be shown. If a user chooses to hide their user access history at the document level for the collaborative document 116 or at the global document level for any collaborative documents, then the user access history 600 may exclude user access history pertaining to that user for the collaborative document 116.

Each line item in the user access history 600 may include a user icon 610 selected by the particular user or a default icon, the identity 612 (e.g., name) of the user, an identifier 614 of whether the name (e.g., "You") is associated with the user viewing the user access history 600, an indication 616 of when the user accessed the collaborative document 116, and a selectable option 618 to enable performing an action for the corresponding user. The selectable option 618 may be any suitable UI element that enables selection (e.g., checkbox, radio button, slider, drop down list, etc.).

In one implementation, the indication 616 may represent when the user most recently accessed the collaborative document 116. In an implementation, the indication 616 may include a generalized time period of when the user accessed the collaborative document 116. A generalized time period may provide comfort to certain users who dislike the idea of having the exact time of when they accessed the collaborative document 116 from being visible to other collaborators. For example, the indications 616 with generalized time periods depicted in the user access history 600 include "Within the hour," "This morning," "Monday," and "Nov. 3." Also, the indication 616 may indicate if users have not yet accessed the collaborative document 116 ("Never").

In certain instances, the user access history 600 may provide insights to a user to determine who has viewed the collaborative document 116 and when, and who has not viewed the collaborative document 116. The user may use the selectable options 618 to take action (described in more detail below with respect to FIGS. 11A-13) by sending a message, for example, to a user, such as "Bill Webber", who has not yet accessed the collaborative document 116. Other actions that may be performed using the consolidated view 602 may include, for example, requesting feedback, alerting selected users of a change to the collaborative document 116, etc. The user may update their privacy settings by clicking a "PRIVACY SETTINGS" button 620 provided in the consolidated view 602.

FIGS. 7A-7D illustrate examples of using a visual indicator 700 representing user access history on the user interface 124A, in accordance with one implementation of the disclosure. The visual indicator 700 may be a graphic (e.g., a graphical representation of an eye), text (e.g., "Your access history is shown" or "Your access history is not shown"), image, or the like. The visual indicator 700 may be located anywhere on the canvas of the user interface 124A and is not limited to the particular depicted location. In other implementations, a dropdown menu may provide a link to display the user access history 600 or privacy settings associated with the user access history 600.

Figure 7A:
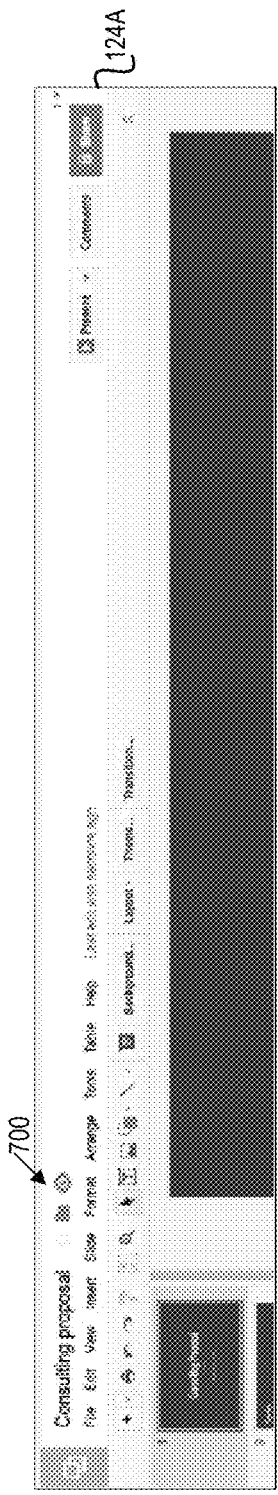
FIGS. 7A-7D illustrate examples of using a visual indicator representing user access history on the user interface, in accordance with one implementation of the disclosure.

FIG. 7A illustrates the visual indicator 700 as a graphical representation of an eye, which may indicate that the access history for the user associated with the collaborative document 116 or for any collaborative document is enabled. Thus, other collaborators may be able to see when the user accesses the collaborative document 116. In one implementation, selecting the visual indicator 700 may open the consolidated view 602 including the user access history 600 in the user interface 124A displaying the collaborative document 116.

Figure 7B:
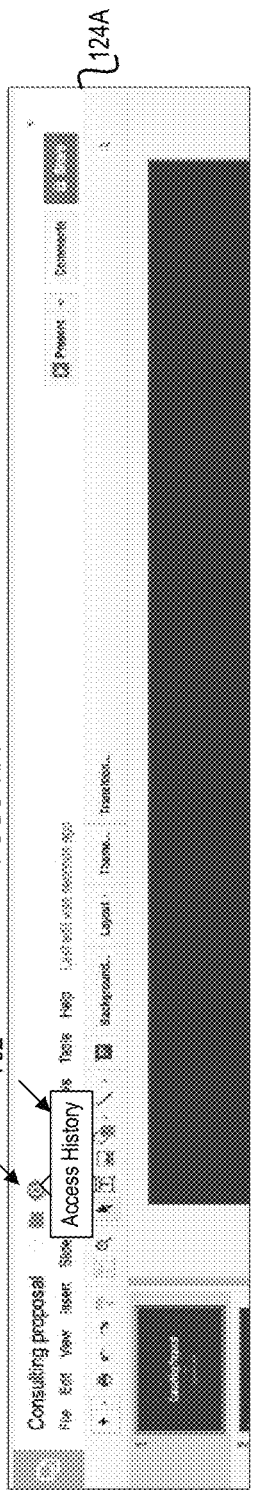

In another implementation, selecting or hovering over the visual indicator 700 may cause a menu to appear that provides a link 702 to the user access history 600, as shown in FIG. 7B. The menu may be displayed in the user interface 124A presenting the collaborative document 116. If the user selects the link, the user access history 600 may be displayed. In an implementation, if the user selects or hovers over the visual indicator 700, a menu may appear that provides a link 702 to user access privacy settings. If the user selects the link 702, a view including privacy settings may be displayed within the user interface 124A presenting the collaborative document 116.

Figure 7C:
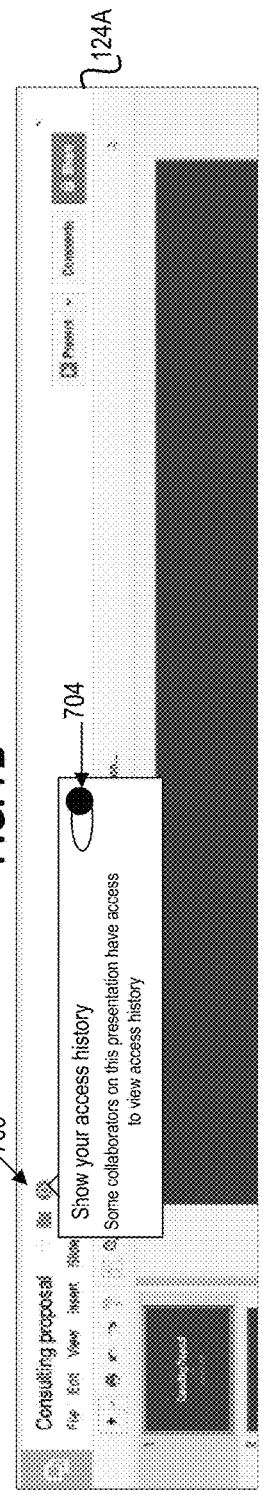
Figure 7D:
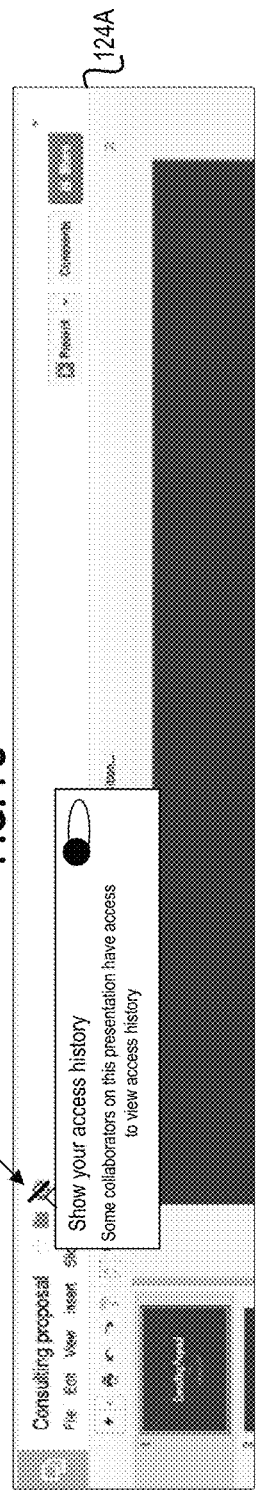

In yet another implementation, depicted in FIG. 7C, selecting or hovering over the visual indicator 700 may cause a menu to appear that provides a selectable option 704 to change the setting 119 associated with access history for the collaborative document 116 or for any collaborative document. When the user changes the selectable option 704 to disable showing user access history for the collaborative document, as shown in FIG. 7D, the visual indicator 700 may change (e.g., the eye has a strikethrough) to indicate that access history viewing is disabled.

Figure 8:
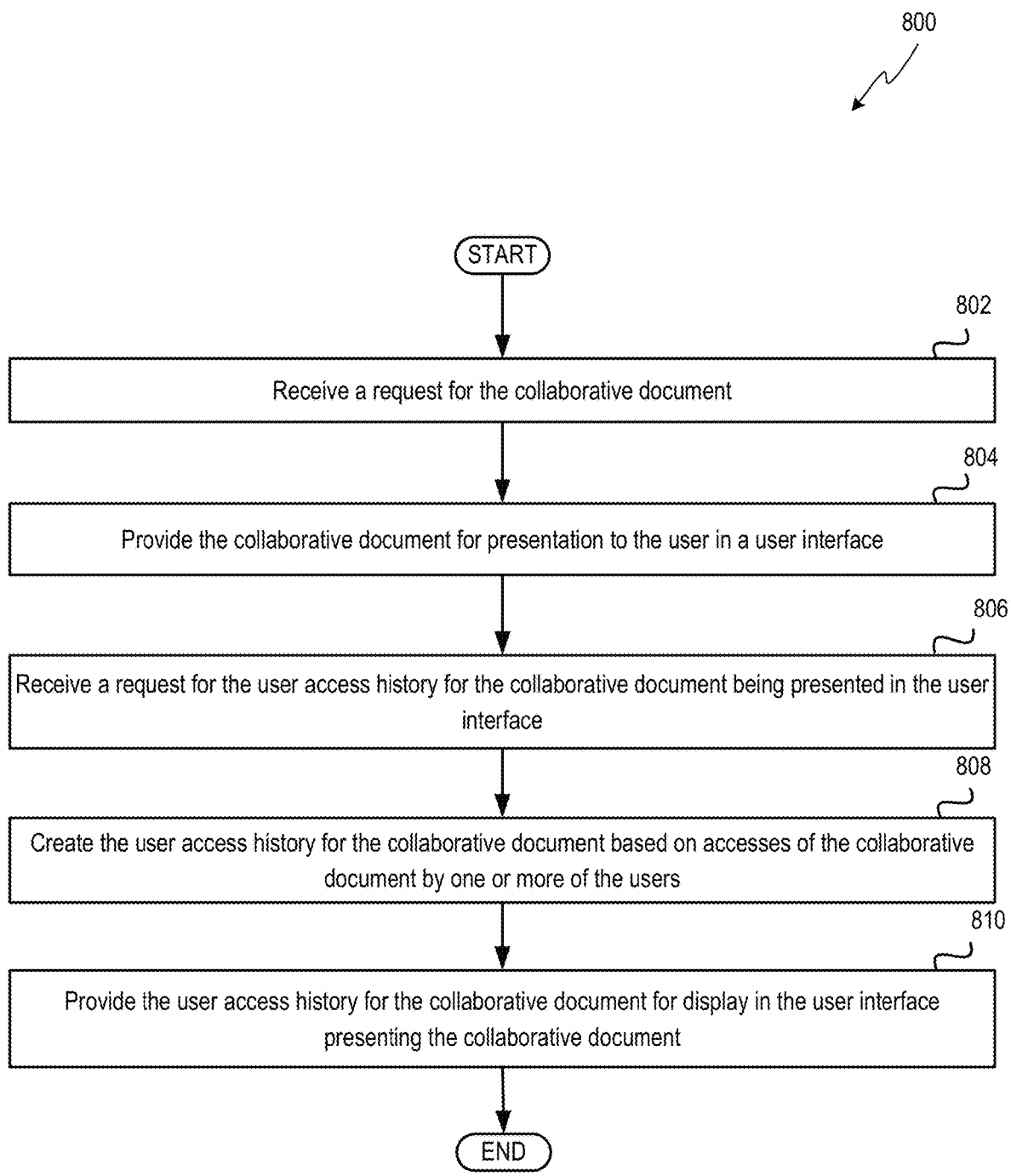
FIG. 8 depicts a flow diagram of aspects of a method for a server providing the user access history for the collaborative document for display in the user interface presenting the collaborative document, in accordance with one implementation of the disclosure.

FIG. 8 depicts a flow diagram of aspects of a method 800 for a server providing the user access history 600 for the collaborative document 116 for display in the user interface 124A presenting the collaborative document 116, in accordance with one implementation of the disclosure. Although the user interface 124A is used for discussion of method 800, it should be understood that any other user interface 124B-124Z may be used, instead of or in addition to the user interface 124A, to display the user access history 600 and the collaborative document 116. For example, multiple user interfaces 124A-124Z may simultaneously display the user access history 600 and the collaborative document 116. Method 800 may be performed in the same or a similar manner as described above in regards to method 300. Also, method 800 may be performed by processing devices of one or more of the servers 112A-112Z executing the user access history modules 118A-118Z in the cloud-based environment 110.

Method 800 may begin at block 802. At block 802, the processing device may receive a request for the collaborative document 116. The request may be received from a user device 120A executing the collaborative document environment 122A. The collaborative document 116 may be open in one or more of the collaborative document environments 122B-122Z on other user devices 120B-120Z when the request is received. In one implementation, the user access data 117 included in the access request may be stored by the processing device in the data store 114.

At block 804, the processing device may provide the collaborative document 116 for presentation to the user in the user interface 124A. For example, the processing device may retrieve the collaborative document 116 from the data store 114 and transmit the collaborative document 116 to the collaborative document environment 122A executing on the user device 120A. The collaborative document environment 122A may present the collaborative document 116 in the user interface 124A. In an implementation, the user device 120A may transmit a file read receipt to the cloud-based environment 110 when the user accesses the collaborative document 116, such that the user access data 117 may be stored in the data store 114.

At block 806, the processing device may receive a request for the user access history 600 for the collaborative document 116 being presented in the user interface 124A. The user may select a visual indicator of the user access history on the canvas of the user interface 124A (e.g., visual indicator 700), from an informational view 400 (e.g., "OPEN" button 406), or from a drop-down menu (e.g., a link).

At block 808, the processing device may create the user access history 600 for the collaborative document 116 based on the user access data 117 including accesses of the collaborative document 116 by one or more of the users. The processing device may retrieve the user access data 117 from the data store 114 and identify user accesses for the collaborative document 116. Also, the processing device may retrieve the settings 119 and determine which users have explicitly declined to allow their user access history to be shown. The processing device may exclude the user access data 117 associated with users that have explicitly declined from the user access history 600. The created user access history 600 may include the identity of the users with permission to access the collaborative document 116 and an indicator of when the users have accessed the collaborative document 116 or whether the users have not yet accessed the collaborative document 116. In an implementation, the user access history 600 may also include group metadata that specifies an identity of a group including users with permission to access the collaborative document 116.

At block 810, the processing device may provide the user access history 600 for the collaborative document 116 for display in the user interface 124A presenting the collaborative document 116. The user access history 600 may be displayed in the consolidated view 602 as depicted in FIG. 6. There may be selectable options to perform one or more actions corresponding to each of the users in the user access history 600. For example, if a certain user has not accessed the collaborative document 116 since a substantial change was made, then the user may send a message to that user to encourage them to access (e.g., review, edit, view) the collaborative document 116.

Figure 9:
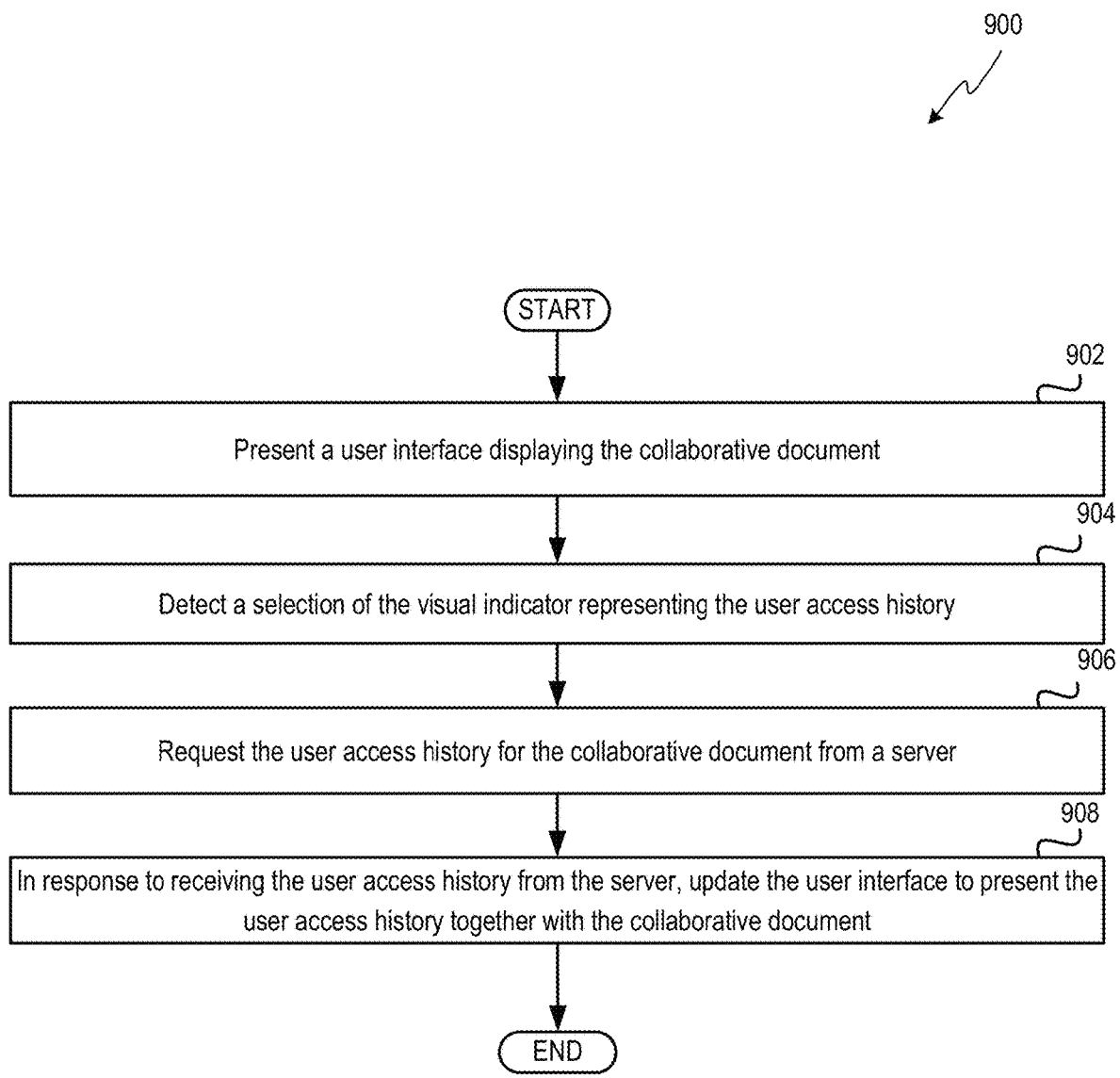
FIG. 9 depicts a flow diagram of aspects of a method for a user device presenting the user access history together with the collaborative document, in accordance with one implementation of the disclosure.

FIG. 9 depicts a flow diagram of aspects of a method 900 for a user device 120A updating the user interface 124A to present the user access history 600 together with the collaborative document 116, in accordance with one implementation of the disclosure. Although the user interface 124A is used for discussion of method 900, it should be understood that any other user interface 124B-124Z may be used, instead of or in addition to the user interface 124A, to display the user access history 600 and the collaborative document 116. For example, multiple user interfaces 124A-124Z may simultaneously display the user access history 600 and the collaborative document 116. Method 900 may be performed in the same or a similar manner as described above in regards to method 300. Also, method 900 may be performed by processing devices of one or more of the user devices 120A-120Z executing the collaborative document environments 122A-122Z. For purposes of clarity, the user device 120A is referenced throughout the discussion of method 900.

Method 900 may begin at block 902. At block 902, the processing device may present the user interface 124A displaying the collaborative document 116. The user interface 124A may include a visual indicator representing the user access history 600. In some examples, the visual indicator may be a graphic (e.g., the visual indicator 700 is an eye 700 in FIGS. 7A-7D), image, text, button (e.g., "OPEN" button 406 in informational view 400 of FIG. 4 or any other button in the user interface 124A), link (e.g., in a drop-down menu or on the canvas of the user interface 124A), or any other suitable visual indicator that represents the user access history 600.

At block 904, the processing device may detect a selection of the visual indicator representing the user access history 600. In an implementation, the user may use a cursor to select the visual indicator, or when the user device 120A implements a touchscreen, the user may tap the visual indicator on the touchscreen. At block 906, the processing device may request the user access history 600 for the collaborative document 116 from the server 112A. For example, responsive to the selection of the visual indicator, the processing device may send a request for the user access history 600 to the server 112A (e.g., any of servers 112A-112Z in the cloud-based environment 110). At block 908, the processing device may, in response to receiving the user access history 600 from the server, update the user interface 124A to present the user access history 600 together with the collaborative document 116 as depicted in FIG. 6.

Figure 10A:
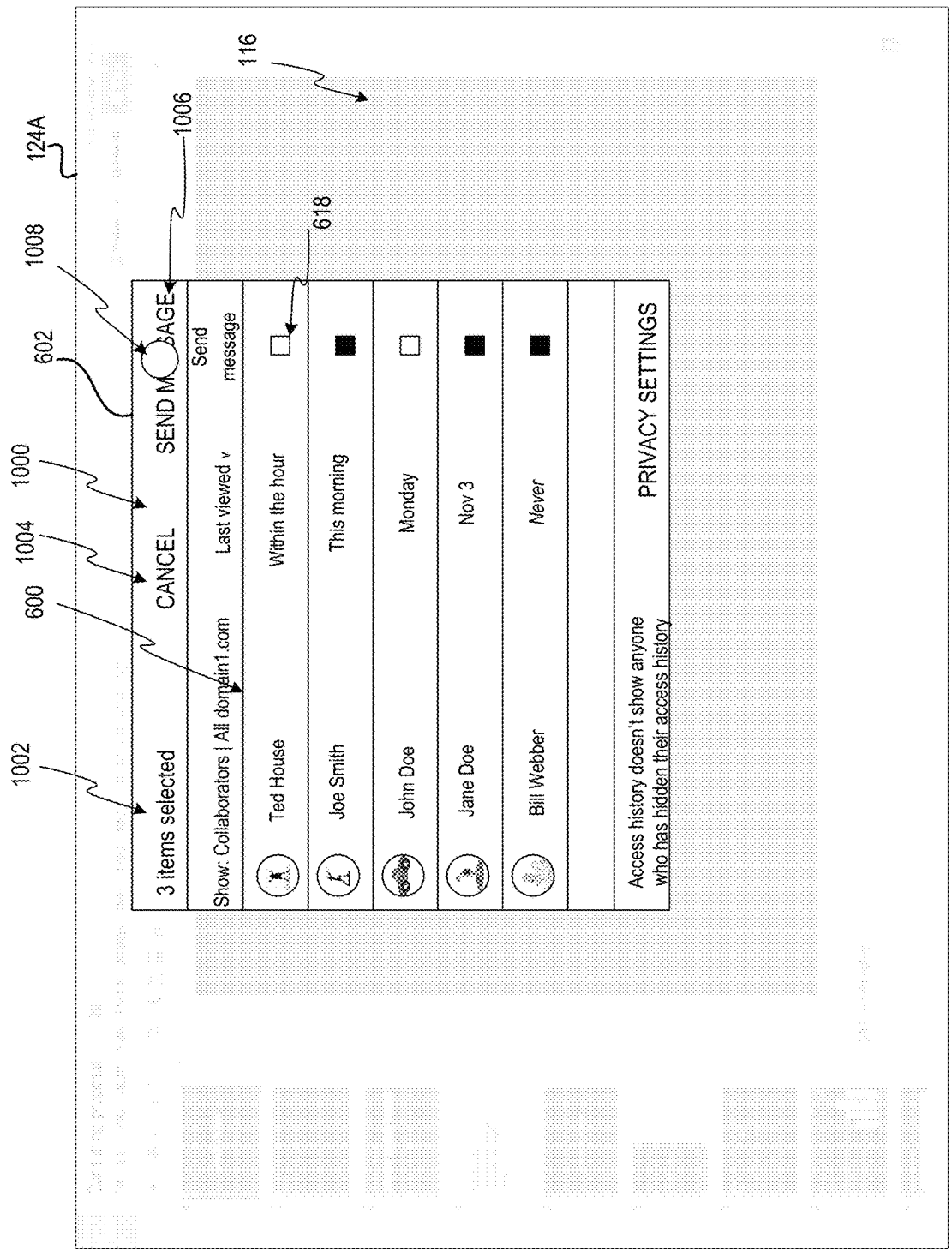
FIGS. 10A-10B illustrate examples of performing an action corresponding to the users in the user access history, in accordance with one implementation of the disclosure.
Figure 10B:
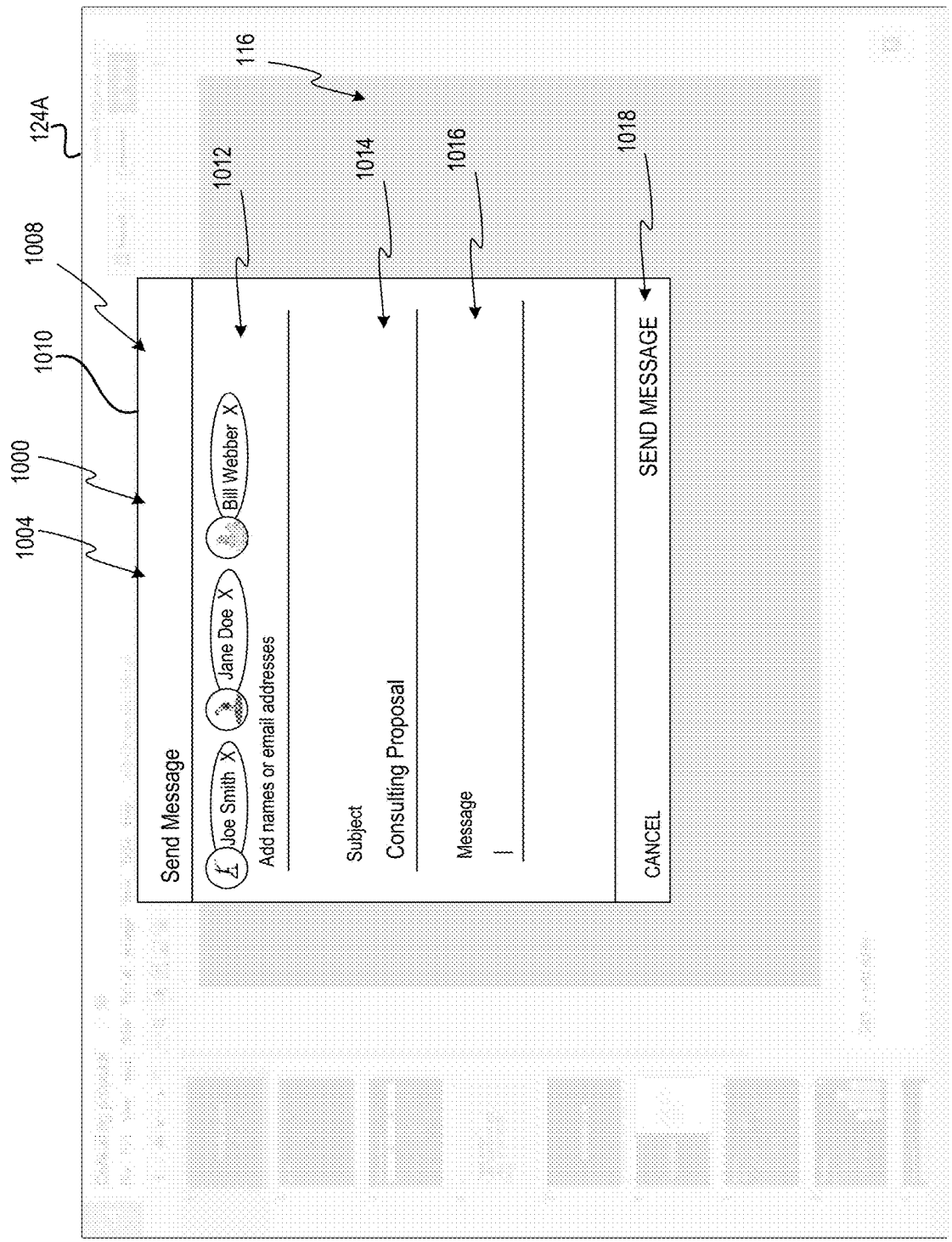

As shown in the consolidated view 602, the user may perform one or more actions corresponding to the users in the user access history 600. As such, FIGS. 10A-10B illustrate examples of performing an action corresponding to the users in the user access history 600, in accordance with one implementation of the disclosure. Although FIGS. 10A-10B depict an example of the action being sending a message, it should be understood that other actions may be performed similarly to as shown. In particular, FIG. 10A depicts a user selecting several of the selectable options 618 in the consolidated view 602 displaying the user access history 600. The user access history 600 remains displayed together with the collaborative view 116 in the user interface 124A. The user selected the selectable option 618 for "Joe Smith," "Jane Doe," and "Bill Webber."

Selecting one or more of the selectable options may cause a bar 1000 to appear in the header of the consolidated view 602. The bar may provide an indication 1002 of how many items (users) are selected via the selectable options 618, a "CANCEL" button 1004 to cancel the selected action, and a "SEND MESSAGE" button 1006. When the user is ready to send a message to the desired users, the user may select (e.g., selection circle 1008) the "SEND MESSAGE" button 1006. The selection may be made via any suitable input apparatus (e.g., mouse, touchscreen, voice command via microphone).

Selecting the "SEND MESSAGE" button 1006 may cause a message view 1010 to appear, as shown in FIG. 10B. Although the message view 1010 is shown for purposes of explanation, it should be understood that any suitable action configuration view may be shown together with the collaborative document 116 in the user interface 124A. The message view 1010 may be displayed in the user interface 124A together with the collaborative document 116. The selected users ("Joe Smith," "Jane Doe," and "Bill Webber") are displayed in a recipient portion 1012. In an implementation, the user may add additional recipients of the message as desired. A subject portion 1014 may include the subject of the message and may be modifiable by the user. In an implementation, the subject may be defaulted to the title of the collaborative document 116. A message portion 1016 may enable a user to enter text of a message they desire to send to the selected users. In an implementation, the user may be able to upload attachments to the message, set deadlines (e.g., dates when feedback is desired, dates when access is desired, etc.), or the like. When the user is satisfied with the message, the user may click a "SEND MESSAGE" button 1018, which may cause the message to be sent to one or more servers 112A-112Z of the cloud-based environment 110, as described below.

Figure 11:
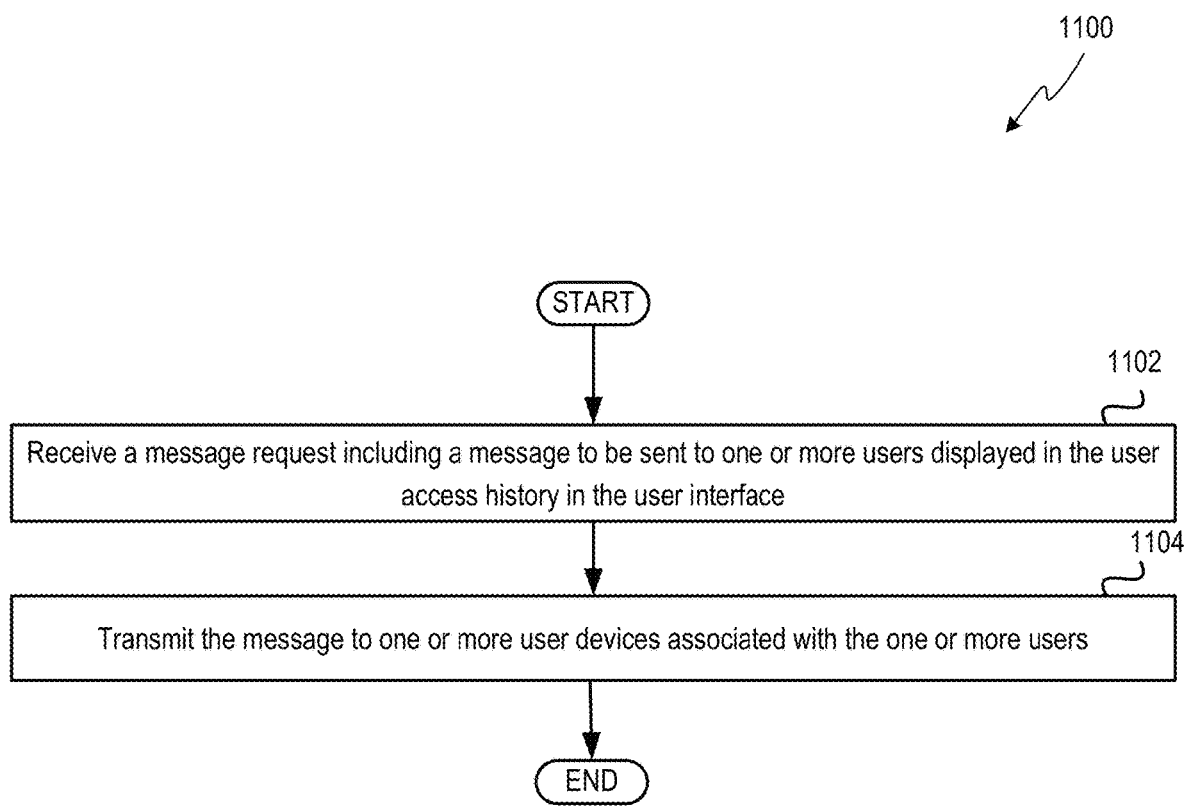
FIG. 11 depicts a flow diagram of aspects of a method for a server receiving a message request from a user device displaying the collaborative document and performing the message request, in accordance with one implementation of the disclosure.

FIG. 11 depicts a flow diagram of aspects of a method 1100 for a server 112A (e.g., any of servers 112A-112Z in the cloud-based environment 110) receiving a message request from a user device 120A displaying the collaborative document 116 and transmitting a message, in accordance with one implementation of the disclosure. Method 1100 may be performed in the same or a similar manner as described above in regards to method 300. Also, method 1100 may be performed by processing devices of one or more of the servers 112A-112Z executing the user access history modules 118A-118Z in the cloud-based environment 110.

Method 1100 may begin at block 1102. At block 1102, the processing device may receive a message request including a message to be sent to one or more users displayed in the user access history 600 in the user interface 124A. As described above, the user viewing the user access history 600 may select one or more selectable options 618 corresponding to users to which the user desires to send a message. The user may complete the message to the selected users in the message view 1010 and may send the message request from the user device 120A by clicking the "SEND MESSAGE" button 108. At block 1104, the processing device may transmit the message to one or more user devices (e.g., 120B-120Z) associated with the one or more users designated as recipients in the message.

Figure 12:
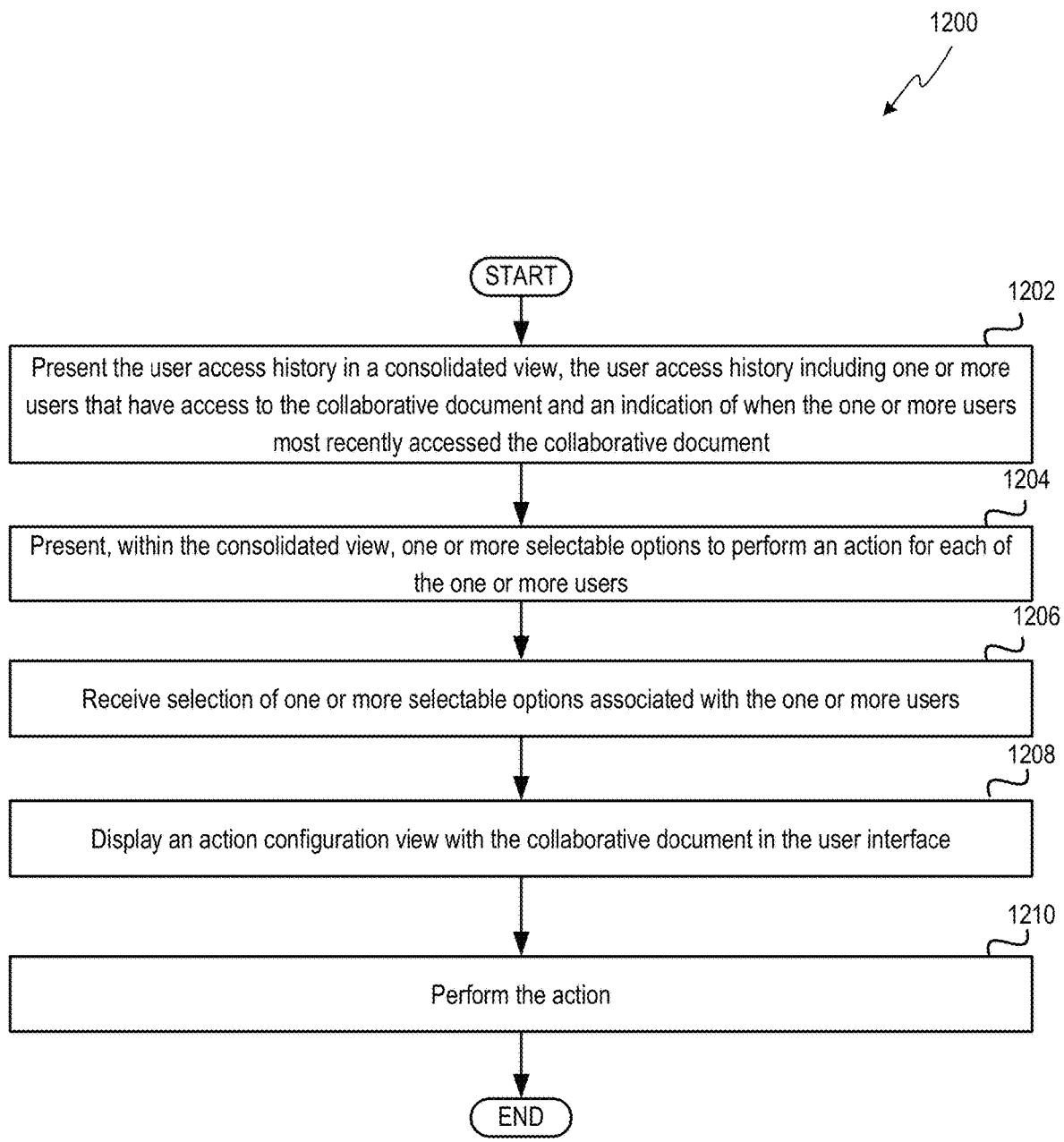
FIG. 12 depicts a flow diagram of aspects of a method for a user device performing an action based on selectable options presented in a consolidated view including the user access history, in accordance with one implementation of the disclosure.

FIG. 12 depicts a flow diagram of aspects of a method 1200 for a user device 120A performing an action based on selectable options 618 presented in the consolidated view 602 including the user access history 600, in accordance with one implementation of the disclosure. Although the user interface 124A is used for discussion of method 1200, it should be understood that any other user interface 124B-124Z may be used, instead of or in addition to the user interface 124A, to display the user access history 600 and the collaborative document 116. For example, multiple user interfaces 124A-124Z may simultaneously display the user access history 600 and the collaborative document 116. Method 900 may be performed in the same or a similar manner as described above in regards to method 300. Also, method 1200 may be performed by processing devices of one or more of the user devices 120A-120Z executing the collaborative document environments 122A-122Z. For purposes of clarity, the user device 120A is referenced throughout the discussion of method 1200.

Method 1200 may begin at block 1202. At block 1202, the processing device may present the user access history 600 in the consolidated view 602. The user access history 600 may specify one or more users that have access to the collaborative document 116 and an indication of when the one or more users most recently accessed the collaborative document 116. Also, the indication may be a generalized time period, as discussed above.

At block 1204, the processing device may present, within the consolidated view 602, one or more selectable options 618 to perform an action for each of the one or more users.

At block 1206, the processing device may receive selection of one or more selectable options 618 associated with the one or more users. For example, the user may select one or more selectable options 618 in the consolidated view 602 and the bar 1000 may appear in the consolidated view 602. The user may select a perform action button (e.g., "SEND MESSAGE" button 1006).

At block 1208, the processing device may display an action configuration view (e.g., message view 1010) with the collaborative document 116 in the user interface 124A in response to the user selecting a perform action button (e.g., "SEND MESSAGE" button 1006). In some implementations, selecting the perform action button (e.g., "SEND MESSAGE" button 1006) may cause the action to be performed without displaying an action configuration view. The user may customize the action (e.g., message) in the action configuration view when displayed. From the action configuration view, the user may select the perform action button (e.g., "SEND MESSAGE" button 1018).

At block 1210, the processing device may perform the action in response to the user selecting either the perform action button in the consolidated view 602 or the action configuration view. In some examples, the action may include sending the message, requesting feedback, setting a deadline, uploading an attachment to aid in reviewing the collaborative document 116, alerting about a change in the collaborative document 116, and the like.

FIGS. 13A-13E illustrate examples of using groups of users in the user access history 600, in accordance with one implementation of the disclosure. In an implementation, the user may organize users with access to the collaborative document 116 into groups. Additionally or alternatively, an administrator may organize the users into groups (e.g., based on departments or teams within an organization). The groups may be stored in the data store 114 in the cloud-based environment 110. Group metadata may include membership information of the users that are part of a certain group. The group metadata may be included in the user access history 600 such that group information may be displayed.

Figure 13A:
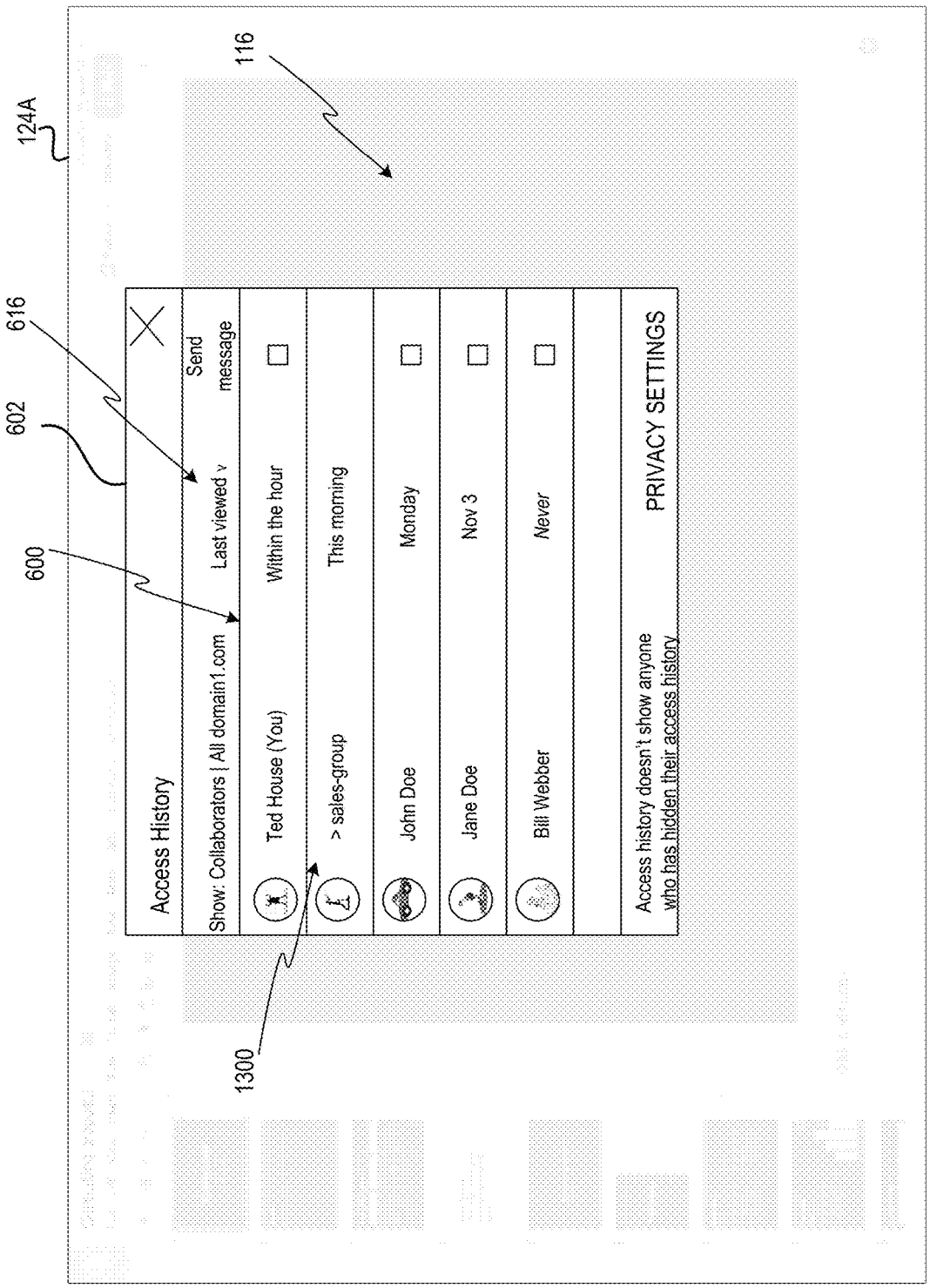
FIGS. 13A-13B illustrate examples of using groups of users in the user access history, in accordance with one implementation of the disclosure.
Figure 13B:
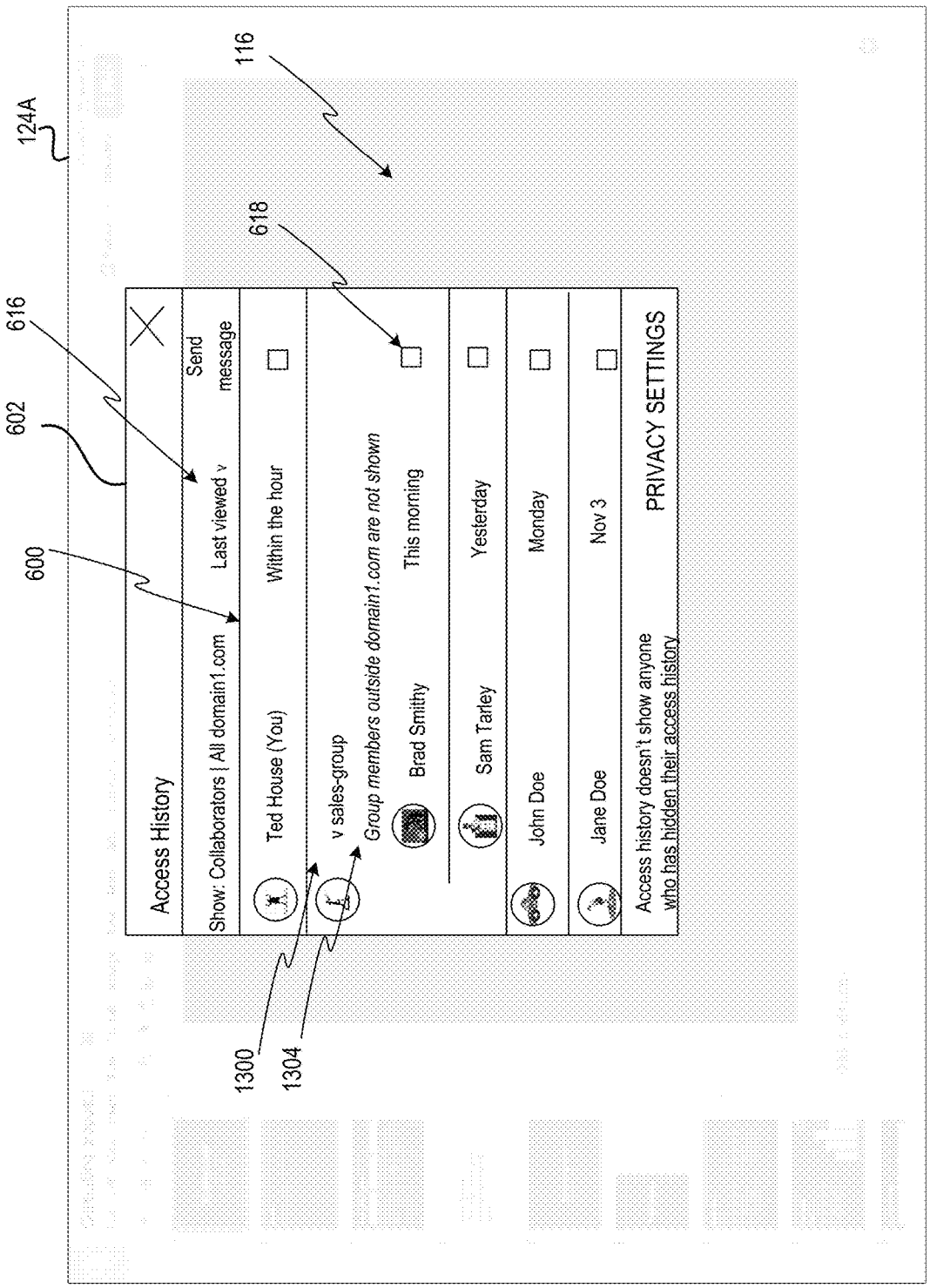

FIG. 13A illustrates one such group 1300 in the user access history 600. As depicted, the group 1300 includes an identity of "sales-group" and it is contracted to just display the identity of the group 1300 without showing the individual members of the group 1300. When the list of information in the user access history 600 is sorted by indication 616 of when the users last viewed the collaborative document 116, the indication 616 for the group 1300 is represented by the most recent access of a user within the group. For example, the indication 616 for the group is depicted as "This morning." Since "This morning" is later than "Within the hour" and "Monday," the group is placed in between users ("Ted House" and "John Doe") associated with those indications 616.

When the user selects to expand the group 1300, the user device 120A may fetch the individual user members from one or more servers 112A-112Z of the cloud-based environment 110. In some instances, there may be a rule that specifies a threshold number of users that can be shown for the group 1300. If the number of users returned from the servers exceeds the threshold, a message may be displayed underneath the identity of the group 1300 in the user access history 600 that the group has too many members to display. Further, if the request fails, a generic error message may be displayed underneath the identity of the group 1300 in the user access history 600 that the group members may not be displayed at that time, for example. It should be noted that these messages may be displayed at any suitable location in the user interface 124A.

If the users of the group 1300 load successfully in the user access history 600, the users may be displayed at location indicative of being part of the group 1300. For example, in FIG. 13B, users ("Brad Smithy" and "Sam Tarley") are displayed below the group 1300 and indented to indicate that the users are part of the group 1300. As previously mentioned, the list in the user access history 600 is sorted by indication 616 of when the users most recently accessed the collaborative document 116. As such, the user ("Brad Smithy") who accessed the collaborative document 116 "This morning" is displayed above the user ("Sam Tarley") who accessed the collaborative document 116 "Yesterday". Also, in FIG. 13A the indication 616 ("This morning") for the group corresponds to the indication 616 for "Brad Smithy" since his access indication 616 is most recent.

In some implementations, external group members may not be shown in the expanded view of the group 1300. As depicted, a message 1304 may be displayed for the group that indicates that group members outside of the domain being shown (e.g., "domain1.com") are not shown. Further, each user in the group 1300 may also include the selectable options 618 to perform an action corresponding to the users in the group 1300.

Figure 14:
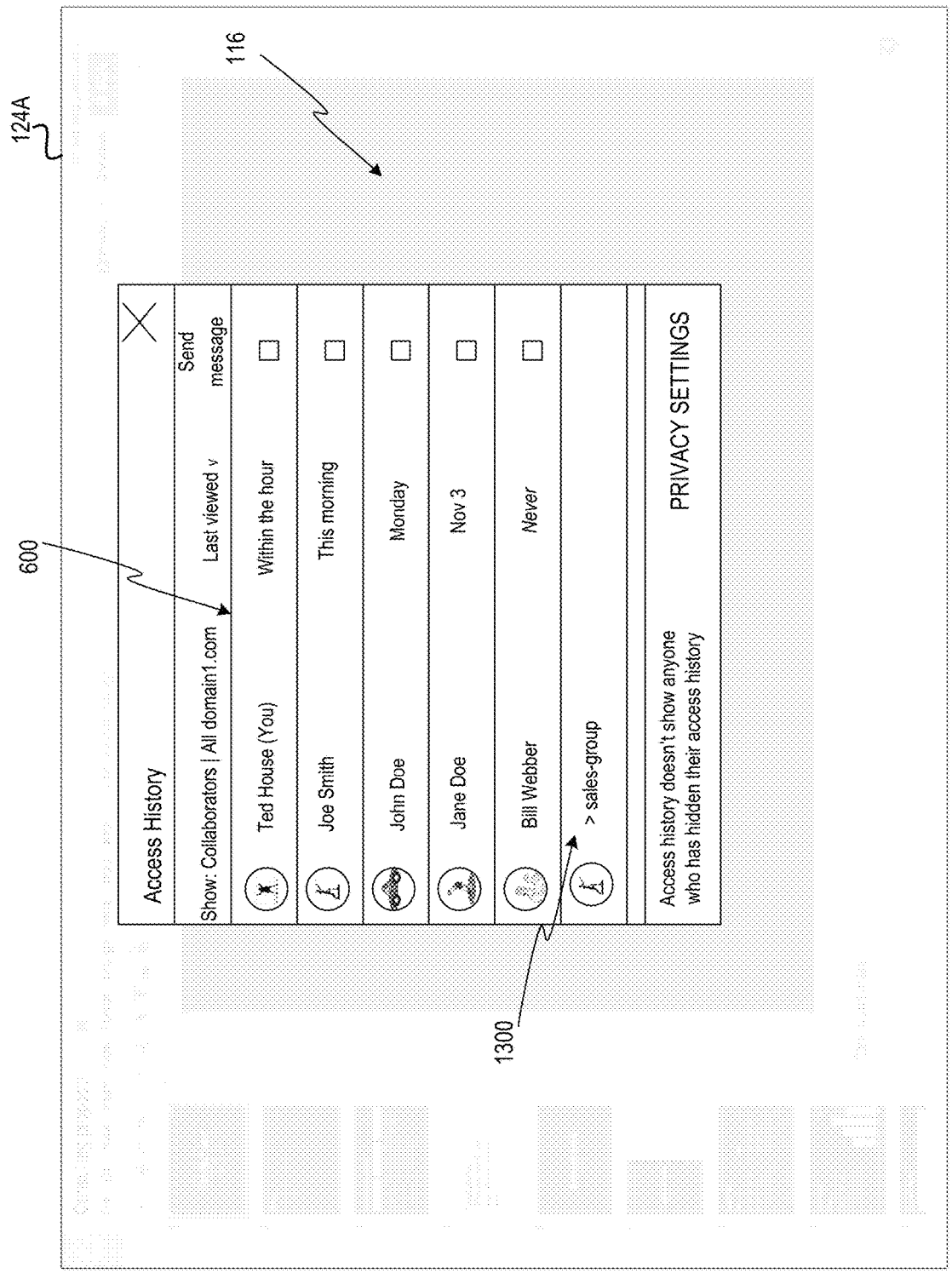
FIG. 14 illustrates an example of displaying a group to which the user does not have access in the user access history, in accordance with one implementation of the disclosure.
Figure 15:
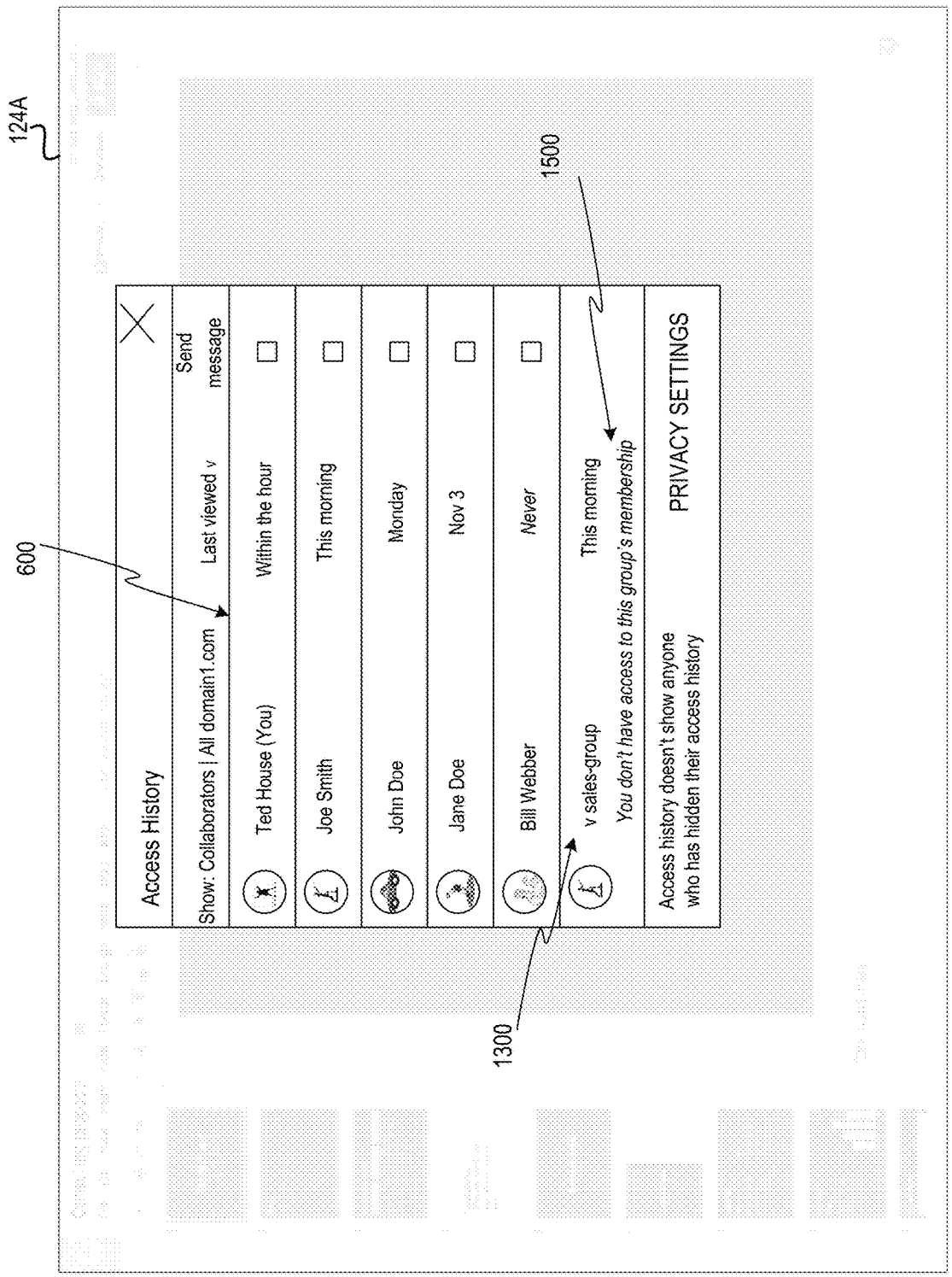
FIG. 15 illustrates another example of displaying a group to which the user does not have access in the user access history, in accordance with one implementation of the disclosure.

In an implementation, the user viewing the user access history 600 may not have access to view the membership details of the group 1300. For example, FIG. 14 illustrates that the user access history 600 includes the group 1300 ("sales-group") but the user viewing the user access history 600 does not have access to view membership details related to the group 1300. As such, there is no indication 616 for when the group 1300 last viewed the collaborative document 116, and the group 1300 is placed at the bottom of the list in the user access history 600. When the user selects to expand the group 1300, a message 1500 is displayed that indicates the user does not have access to the membership details of the group 1300, as illustrated in FIG. 15.

FIGS. 16A-16E illustrate examples of using a user access privacy setting view 1600 to control settings associated with the user access history 600, in accordance with one implementation of the disclosure. The user access privacy setting view 1600 may be displayed in the user interface 124A together with the collaborative document 116. To open the user access privacy setting view 1600, the user may select visual indicators (e.g., link, button, graphic, image, etc.) representing the user access privacy setting view 1600 from any suitable location (e.g., any view described herein, drop-down menu, on canvas of the user interface 124A, etc.) in the user interface 124A displaying the collaborative document 116.

Figure 16A:
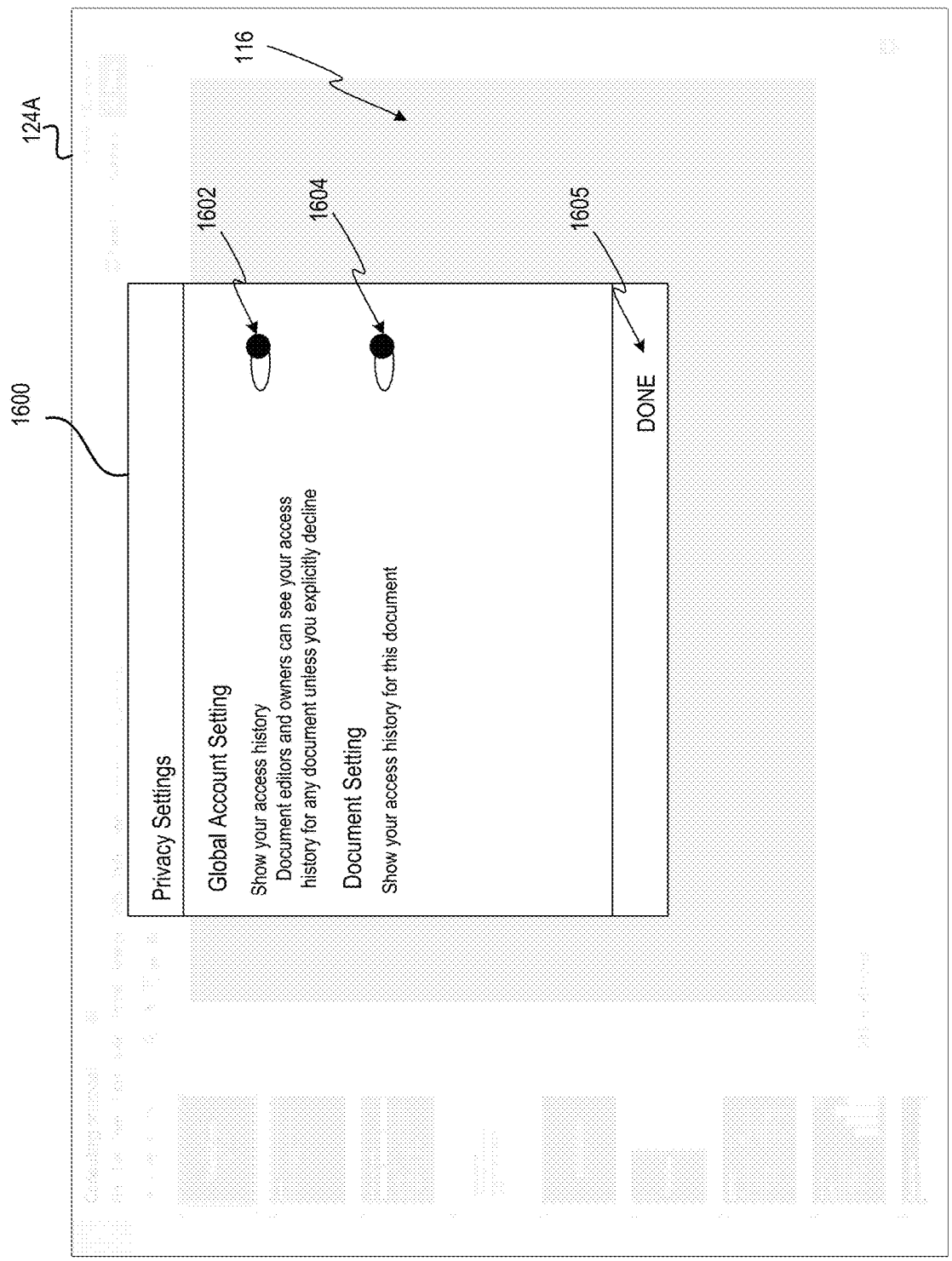
FIGS. 16A-16D illustrate examples of using a user access privacy settings view to control settings associated with the user access history, in accordance with one implementation of the disclosure.

FIG. 16A illustrates an example of a user access privacy setting view 1600 displayed together with the collaborative document 116. The particular example of the user access privacy setting view 1600 may be displayed to users that have a certain user type (e.g., editor) that allows the viewing of the user access history 600. The user access privacy setting view 1600 may include two selectable options: a first selectable option 1602 for global account setting and a second selectable option 1604 for a document setting. The first selectable option 1602 for the global account setting may control whether the user access history is shown for any documents to which the user has permission to access (global access history setting). The second selectable option 1604 for the document setting may control the user access history for the specific collaborative document 116 currently accessed (document level access history setting). The global access history setting and the document level access history setting may be considered settings 119 and may be referred to as privacy settings herein. If the user modifies the first selectable option 1602 and/or the second selectable option 1604, the user may click a "DONE" button 1605 to send the settings 119 to the cloud-based environment 110 to be stored in the data store 114.

As depicted, the user has enabled both the first selectable option 1602 and the second selectable option 1604, and thus, the user has allowed their user access history to be viewed for the particular document and for any document to which the user has permission to access. If the user disables the first selectable option 1602 to explicitly decline their user access history from being shown for any collaborative document, then the second selectable option 1604 may automatically be disabled for the collaborative document 116, as well. In some instances, the second selectable option 1604 may be become hidden from view when the first selectable option 1602 is disabled.

Figure 16B:
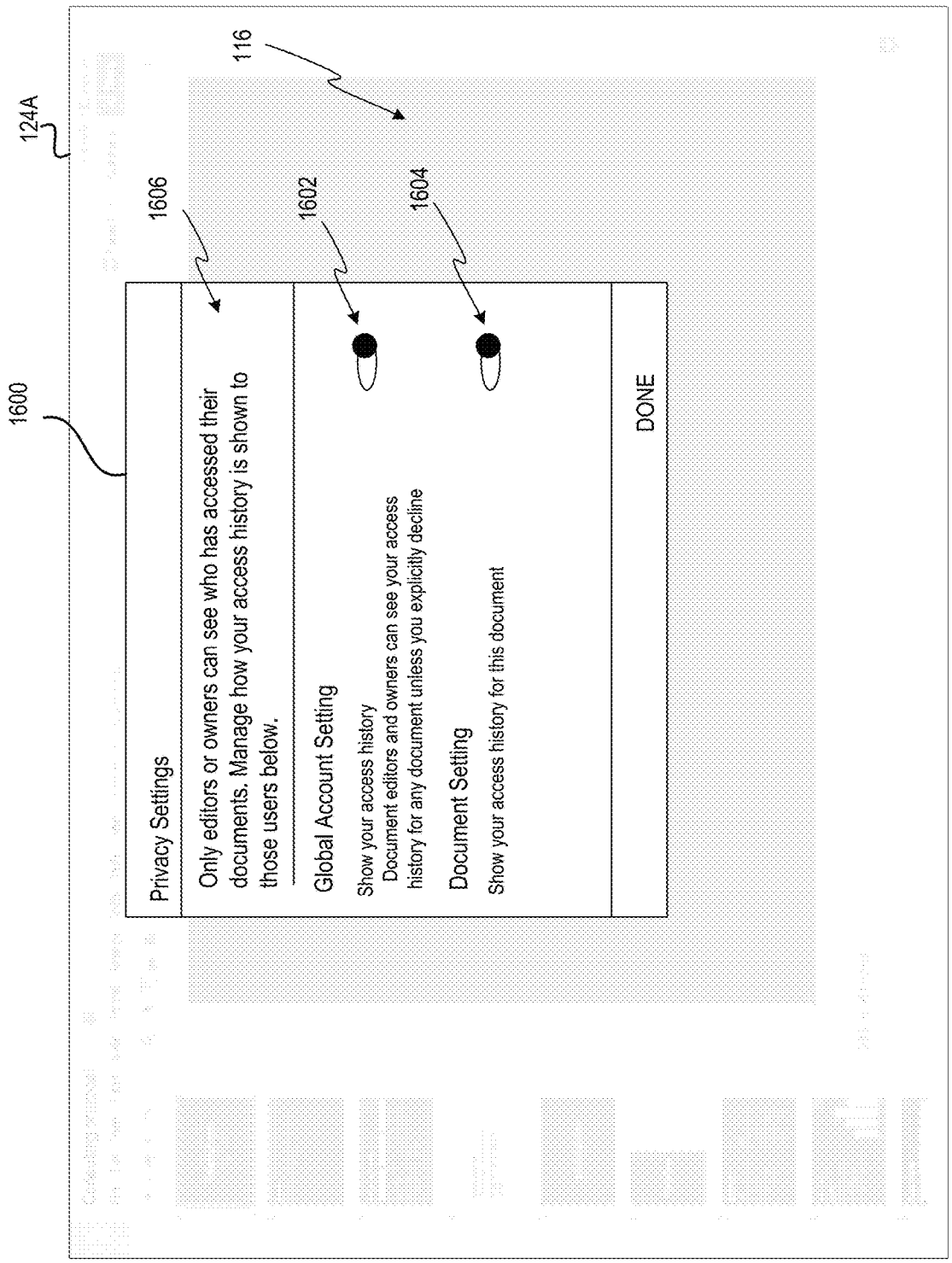

FIG. 16B illustrates another example of the user access privacy setting view 1600 displayed together with the collaborative document 116. This particular example of the user access privacy setting view 1600 may be displayed to users that have a certain user type (e.g., non-editor) that are prevented from viewing the user access history 600. For example, a message 1606 may be displayed in the user access privacy setting view 1600 that indicates that editors or owners of the collaborative document 116 can see who has accessed their collaborative documents, and the user may manage how their access history is shown to those users using the first selectable option 1602 and the second selectable option 1604.

Figure 16C:
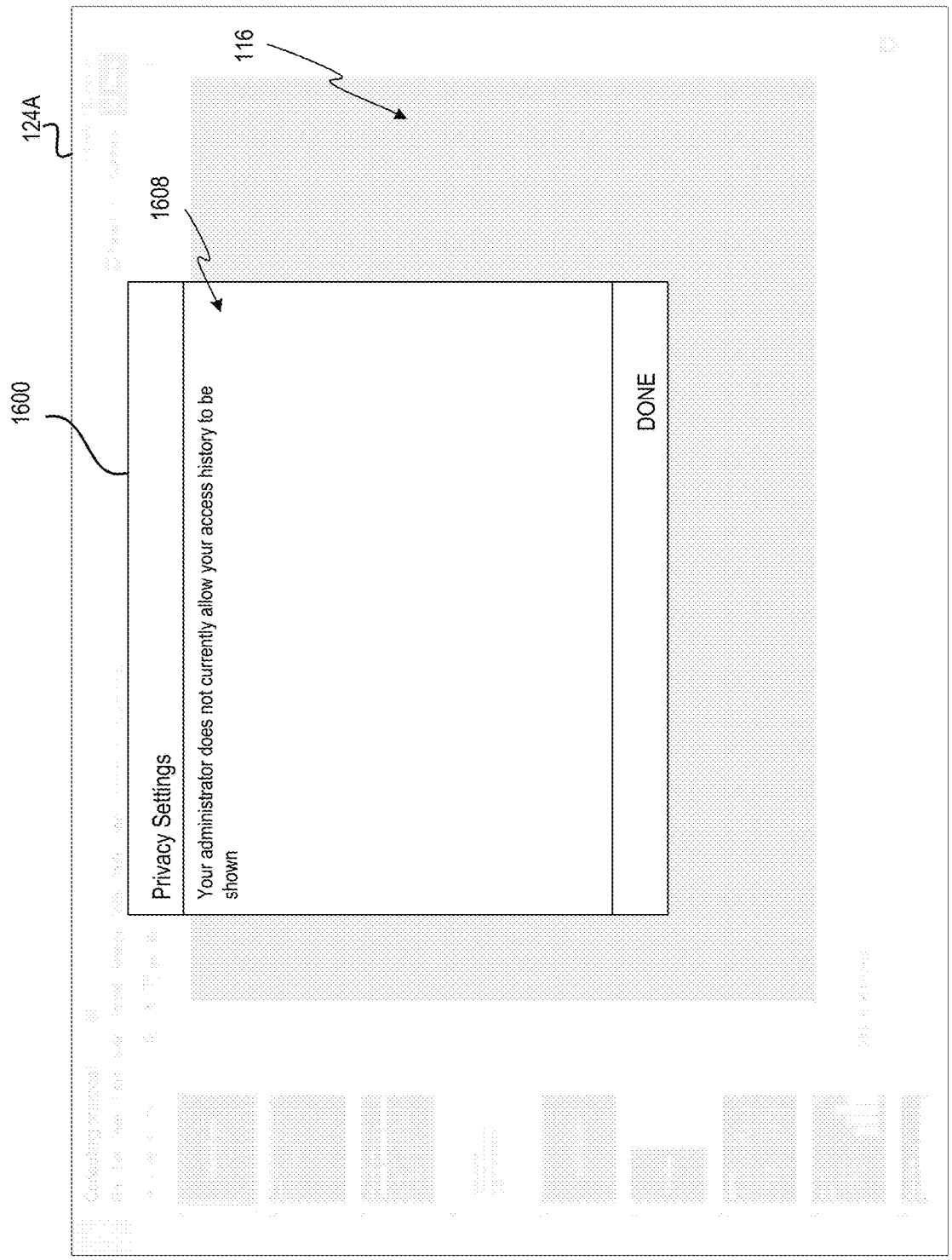

FIG. 16C illustrates another example of the user access privacy setting view 1600 where an administrator has disabled the collection of user access data 117 for the collaborative document 116, thereby preventing the user from modifying their settings 119. In such an instance, the user access privacy setting view 1600 may display a message

1608 indicating that the administrator does not currently allow their access history to be shown. While in this state, the user may not edit their user access privacy settings, in this implementation. For example, the first selectable option 1602 and the second selectable option 1604 may be hidden so the user cannot modify their settings.

Figure 16D:
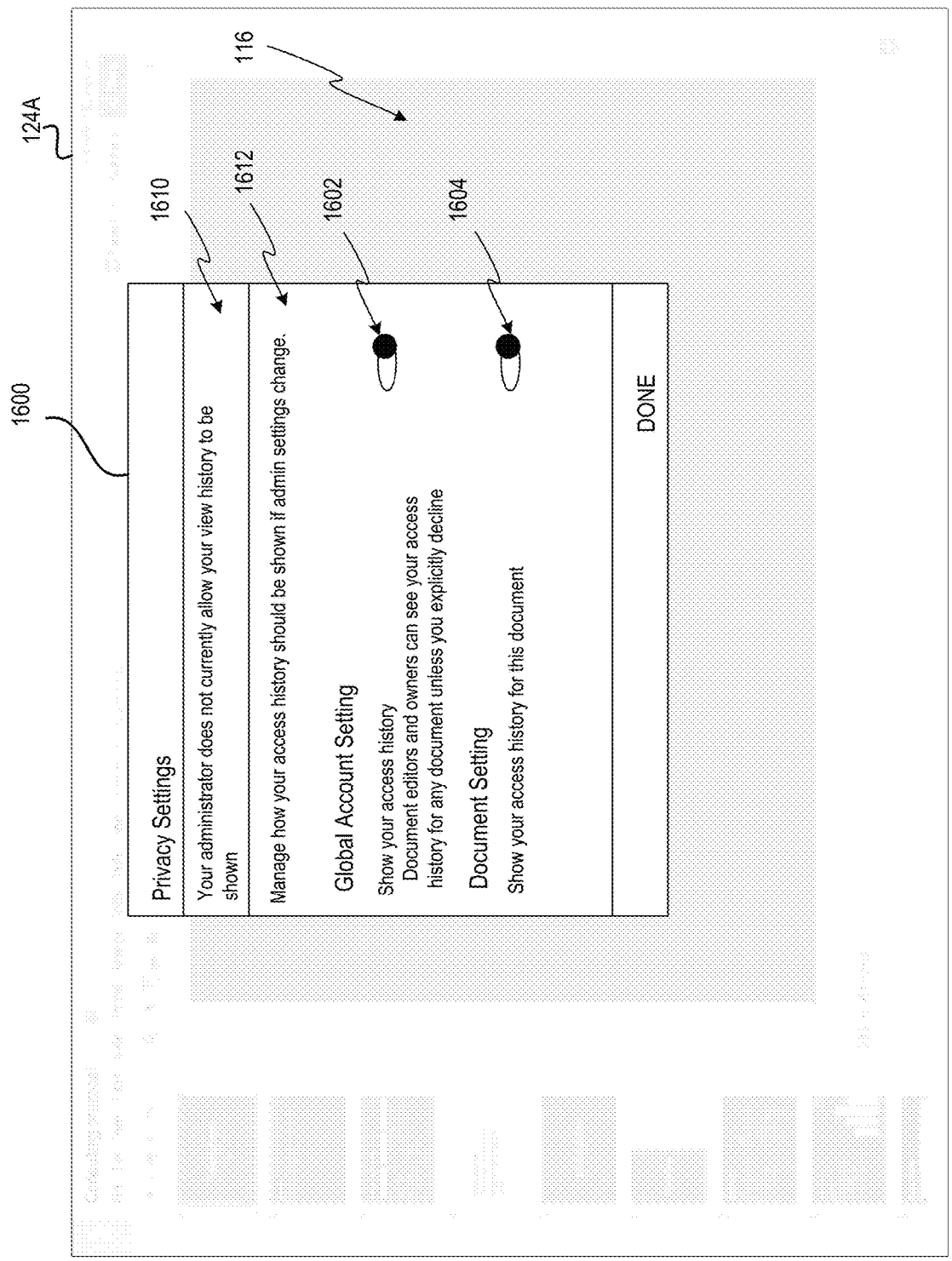

FIG. 16D illustrates another example of the user access privacy setting view 1600 where an administrator has disabled the collection of user access data 117 for the collaborative document 116, but the user is still allowed to modify their settings 119. In such an instance, the user access privacy setting view 1600 may display a message 1610 indicating that the administrator does not currently allow their access history to be shown and may display another message 1612 indicating that the user may manage how their access history should be shown if the administrator changes the setting to collect user access data 117 again. As depicted, the first selectable option 1602 and the second selectable option 1604 remain visible in the user access privacy setting view 1600 so the user can modify their settings 119.

FIGS. 17A-17E illustrate examples of using a general settings view 1700 to control settings associated with the user access history 600, in accordance with one implementation of the disclosure. The general settings view 1700 may be displayed in the user interface 124A together with a home page 1702 displaying the collaborative documents that the user has permission to access. To open the general settings view 1700, the user may select visual indicators (e.g., link, button, graphic, image, etc.) representing the general setting views from any suitable location (e.g., any view described herein, drop-down menu, on canvas of the user interface 124A, etc.) in the user interface 124A displaying the home page 1702.

Figure 17A:
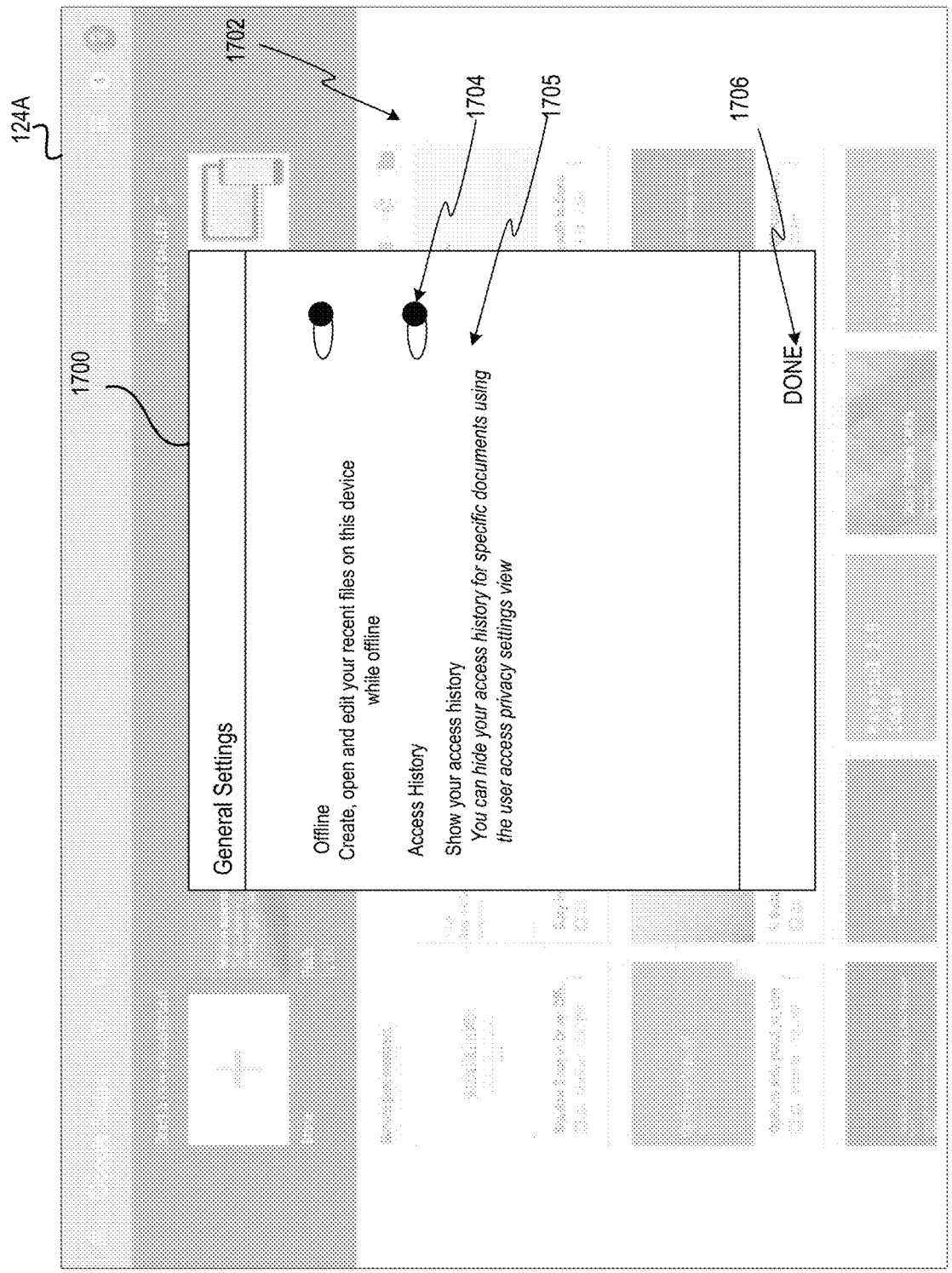
FIGS. 17A-17E illustrate examples of using a general settings view to control settings associated with the user access history, in accordance with one implementation of the disclosure.

FIG. 17A illustrates the general settings view 1700 including a selectable option 1704 for a global account setting (e.g., setting 119). The selectable option 1704 for the global account setting may control whether the user access history is shown for any documents to which the user has permission to access (global access history). In an implementation, the general settings view 1700 may include a message 1705 that indicates that user can hide their user access history for specific documents by accessing the user access privacy settings view 1600. If the user modifies the selectable option 1704, the user may click a "DONE" button 1706 to send the global account setting to the cloud-based environment 110 to be stored in the database 114.

Figure 17B:
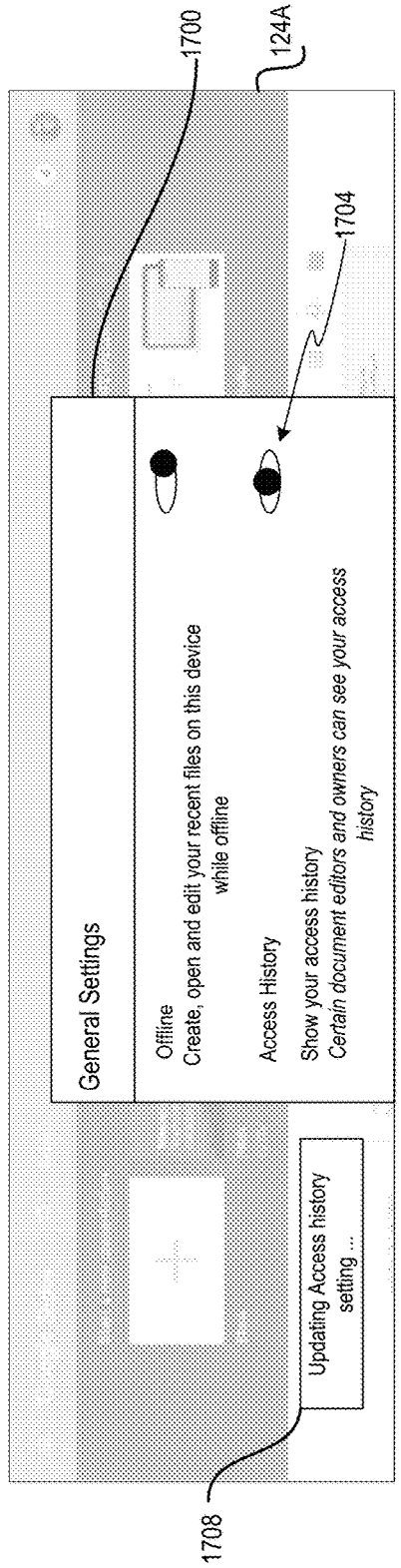
Figure 17C:
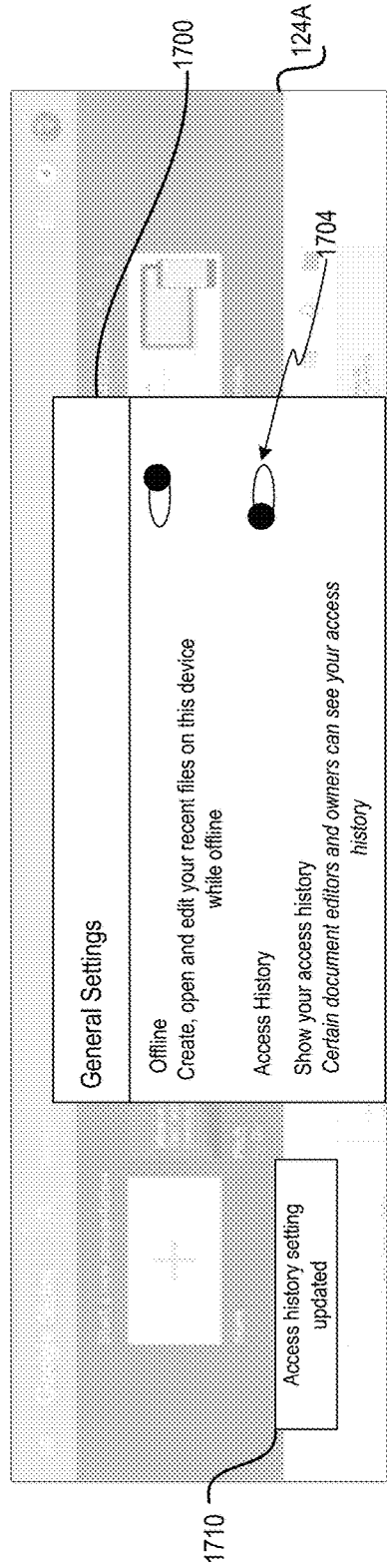

FIGS. 17B-17C illustrate various examples for modifying the selectable option 1704 in the general settings view 1700. It should be understood that the techniques described below for FIGS. 17B-17C may be applicable to any similar selectable option described herein.

In one example, a user may disable the user access history using the selectable option 1704 by sliding the selectable option 1704 from right to left. FIG. 17B illustrates the selectable option 1704 at a middle toggle state until the setting 119 is updated. The selectable option 1704 may remain in this middle toggle state until the setting 119 is accepted by one or more servers 112A-112Z in the cloud-based environment 110 and stored in the database 114. The middle toggle state may provide an indication to the user that the setting 119 is in the process of being updated. While the selectable option 1704 is in the middle toggle state, a message 1708 may be displayed that indicates that the global access history setting is being updated.

FIG. 17C illustrates an example of the general settings view 1700 when the global access history setting is successfully updated. As depicted, the selectable option 1704 is disabled and a message 1710 is displayed that indicates that the global access history setting is updated. Once the global access history setting is updated, other collaborators cannot see the user access history for any collaborative documents associated with the user.

Figure 17D:
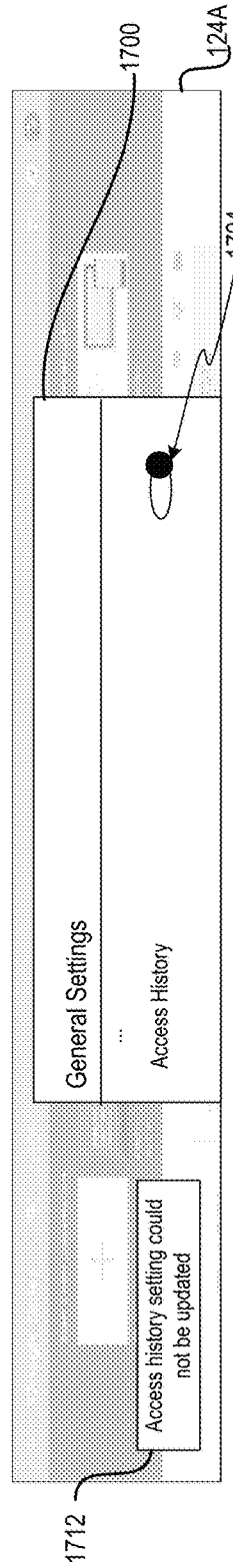

FIG. 17D illustrates an example of the general settings view 1700 when the global access history setting cannot be updated. As depicted, the selectable option 1704 returned to enabled and a message 1712 is displayed that indicates that the global access history setting could not be updated. While the global access history setting is enabled, the certain users allowed to view the user access history 600 can see user access history associated with the user for any collaborative document the user has permission to access.

Figure 17E:
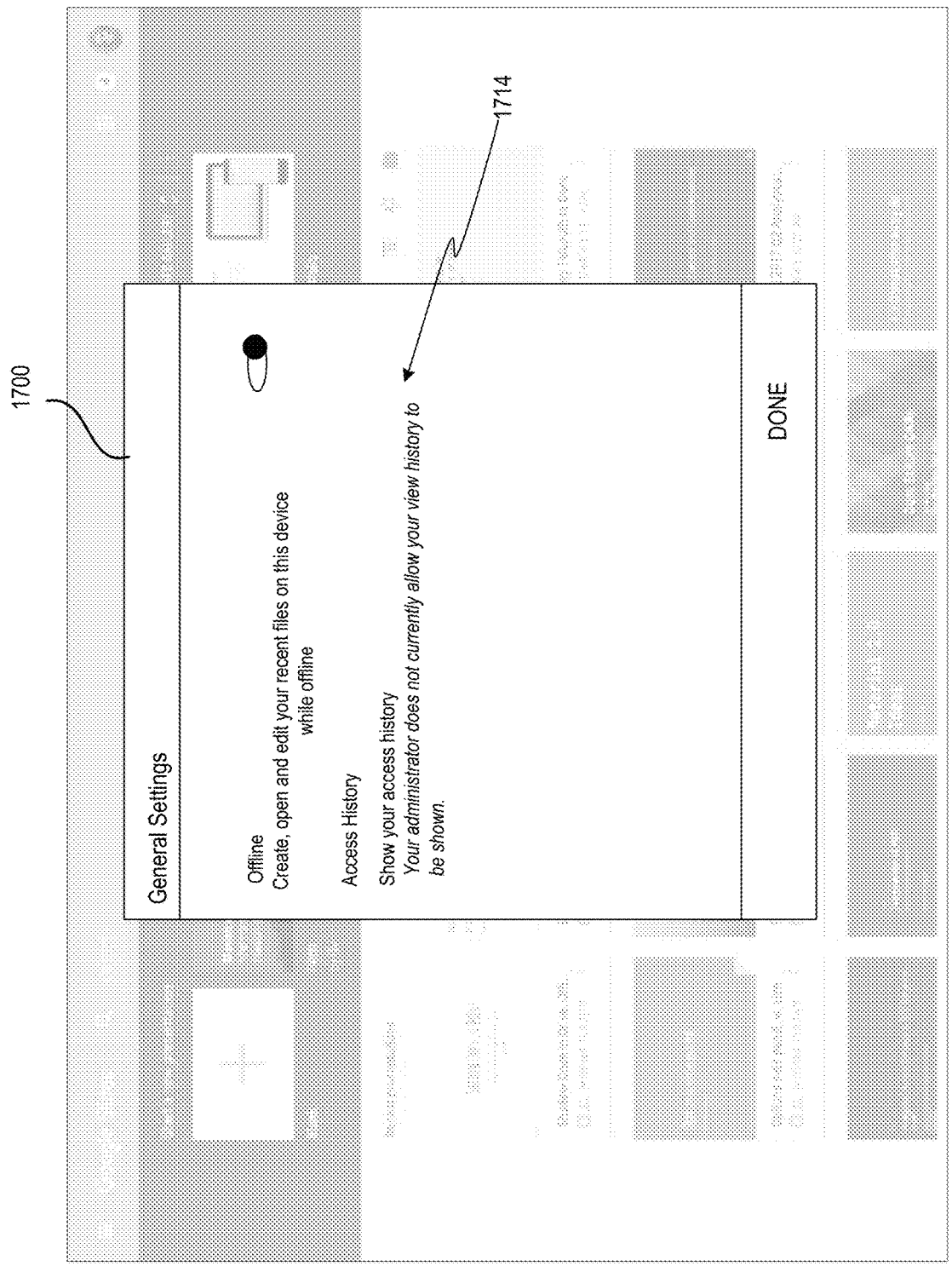

FIG. 17E illustrates an example of the general settings view 1700 when the administrator has disabled the collection of user access data 117. In such a scenario, a message 1714 may be displayed in the general settings view 1700 that indicates that the administrator does not currently allow their access history to be shown. The selectable option 1704 may be hidden such that the user cannot modify their global access setting. In another implementation, the general settings view 1700 may allow the user to update the global access setting by modifying a visible selectable option 1704, and a message may be displayed that indicates that the user can set the global access setting to how they desire their access history to be shown when the administrator changes settings.

Figure 18:
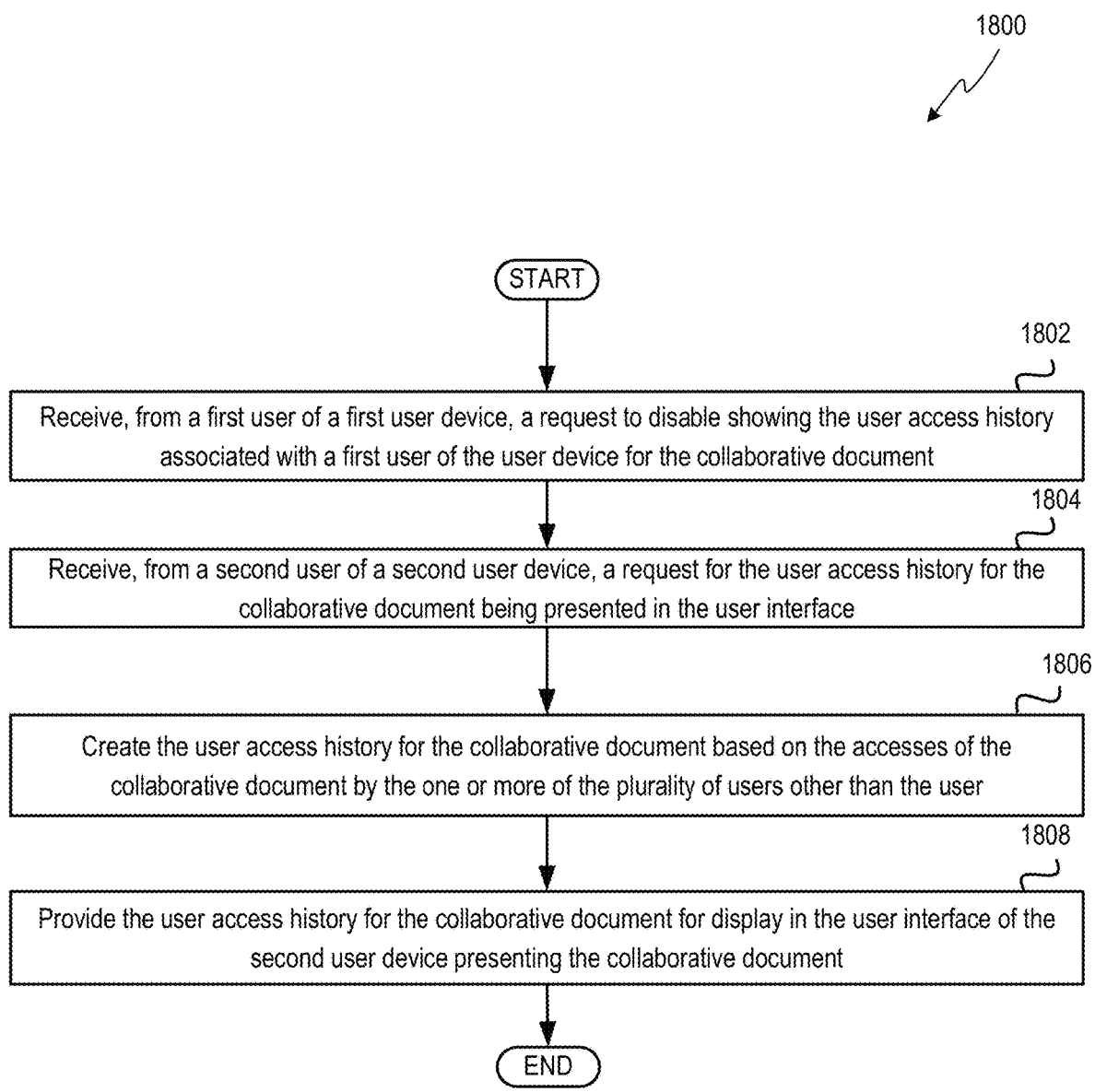
FIG. 18 depicts a flow diagram of aspects of a method for a server to filter out users from the user access history based on privacy settings, in accordance with one implementation of the disclosure.

FIG. 18 depicts a flow diagram of aspects of a method 1800 for a server (e.g., one or more servers 112A-112Z of the cloud-based environment 110) to filter out users from the user access history 600 based on privacy settings 119, in accordance with one implementation of the disclosure. Method 1800 may be performed in the same or a similar manner as described above in regards to method 300. Also, method 1800 may be performed by processing devices of one or more of the servers 112A-112Z executing the user access history modules 118A-118Z in the cloud-based environment 110.

Method 1800 may begin at block 1802. At block 1802, the processing device may receive a request to disable showing the user access history associated with a first user (e.g., user A) of the user device 120A for the collaborative document 116. The request may include a document level access history setting (setting 119) indicating that user A explicitly declines to allow their user access for the collaborative document 116 to be shown. The server (112A-112Z) may store the setting 119 in the data store 114.

At block 1804, the processing device may receive, from a second user (e.g., user B) of user device 120B, a request for the user access history 600 for the collaborative document 116 being presented in the user interface 124B. At block 1806, the processing device may create the user access history 600 for the collaborative document 116 based on the user access data 117 and the document level access history setting 119. For example, the processing device may exclude the user access history for user A with the document level access history setting 119 that indicates user A explicitly declined to allow their user access history to be shown for the collaborative document 116. The processing device may exclude any other user access data 117 from the user access history 600 for other users that explicitly declined, based on the document level access history setting 119, to allow their user access history to be shown for the collaborative document 116. The processing device may just include user access history 600 for users that allow their user access history to be shown for the collaborative document 116 (based on the document level access history setting 119).

In an implementation, the processing device may use the global access history setting 119 instead of or in addition to the document level access history setting 119 when creating the user access history 600. For example, if a user set the global access history setting 119 to disabled, then the processing device may exclude the user access history for that user for the collaborative document 116. Additionally, if the user access history 600 is requested for any other collaborative document, the user that set the global access history setting 119 to disabled may also be excluded from the user access history 600 for those collaborative documents.

At block 1808, the processing device may provide the user access history 600 for the collaborative document 116 for display in the user interface 124B presenting the collaborative document 116. It should be noted that the user access history 600 does not include access history for any users that set the document level access history setting 119 to disabled or the global access history setting 119 to disabled.

Figure 19:
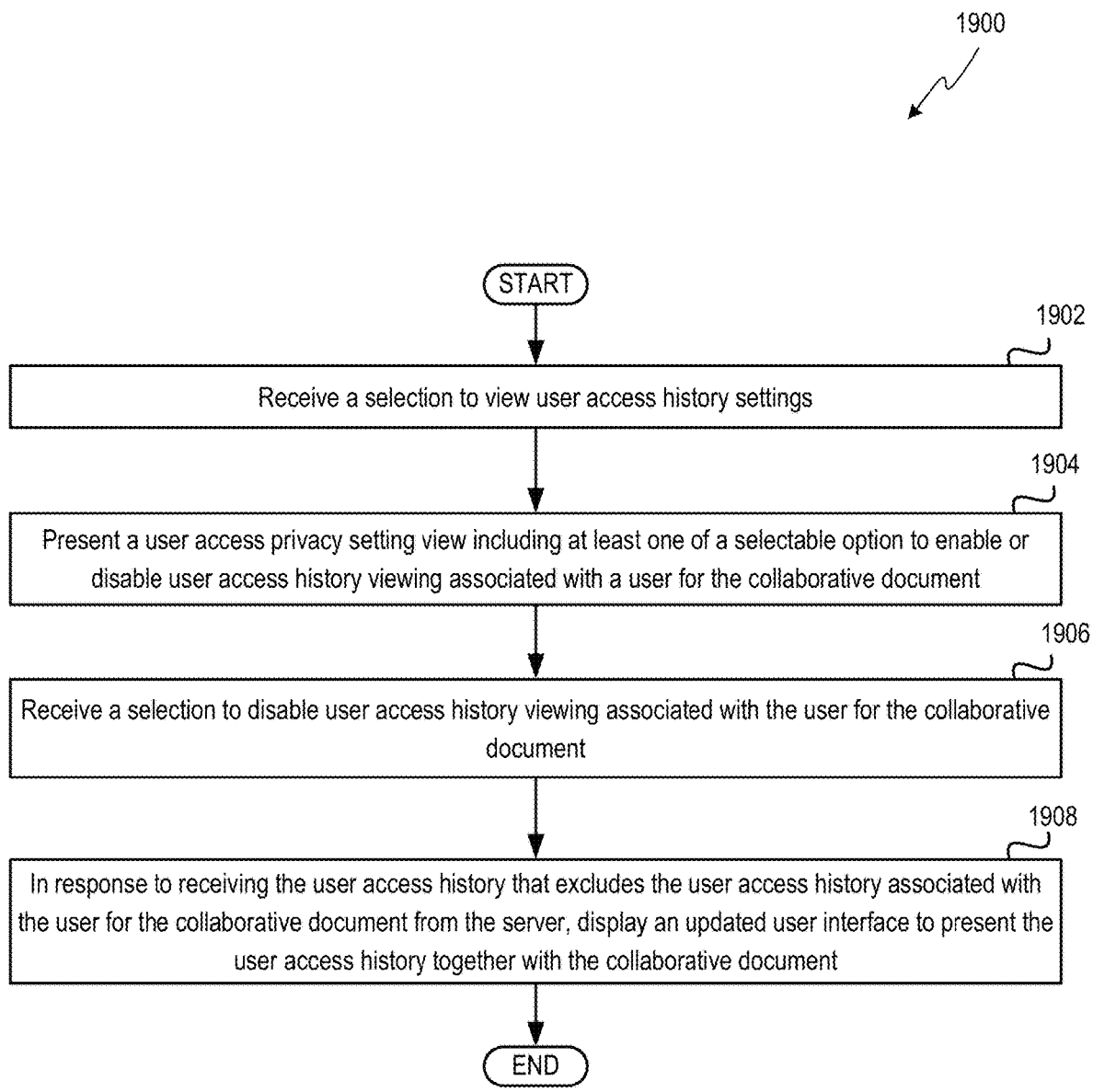
FIG. 19 depicts a flow diagram of aspects of a method for a user device to allow a user to disable user access history viewing for the collaborative document, in accordance with one implementation of the disclosure.

FIG. 19 depicts a flow diagram of aspects of a method 1900 for a user device 120A to allow a user to disable user access history viewing for the collaborative document 116, in accordance with one implementation of the disclosure. Method 1900 may be performed in the same or a similar manner as described above in regards to method 300. Also, method 1900 may be performed by processing devices of one or more of the user devices 120A-120Z executing the collaborative document environments 122A-122Z. For purposes of clarity, the user device 120A is referenced throughout the discussion of method 1900.

Method 1900 may begin at block 1902. At block 1902, the processing device may receive a selection to view user access history settings. The selection may be received via a visual indicatory (e.g., button, link, graphic, image, etc.) located at any suitable location (e.g., on the canvas of the UI 124A, in a drop-down menu of the UI 124A, on any view presented in the UI 124A, etc.) of the UI 124A presenting the collaborative document 116.

At block 1904, the processing device may present the user access privacy setting view 1600 including at least one of a selectable option (e.g., the second selectable option 1604) to enable or disable user access history viewing associated with the user for the collaborative document 116 (document level access history setting 119). At block 1906, the processing device may receive a selection, via the second selectable option 1604, to disable the user access history viewing associated with the user for the collaborative document 116. The user device 120A may transmit a request to the server (one or more of servers 112A-112Z) to set the document level access history setting 119 to disabled. If the server accepts the change to the document level access history setting 119, the document level access history setting 119 may be saved in the database 114. As a result, the server may exclude the access history for the user for the collaborative document 116 based on the document level access history setting 119.

At block 1908, the processing device may, in response to receiving the user access history 600 that excludes the user access history associated with the user for the collaborative document 116 from the server, display an updated user interface 124A to present the user access history 600 together with the collaborative document 116.

Figure 20:
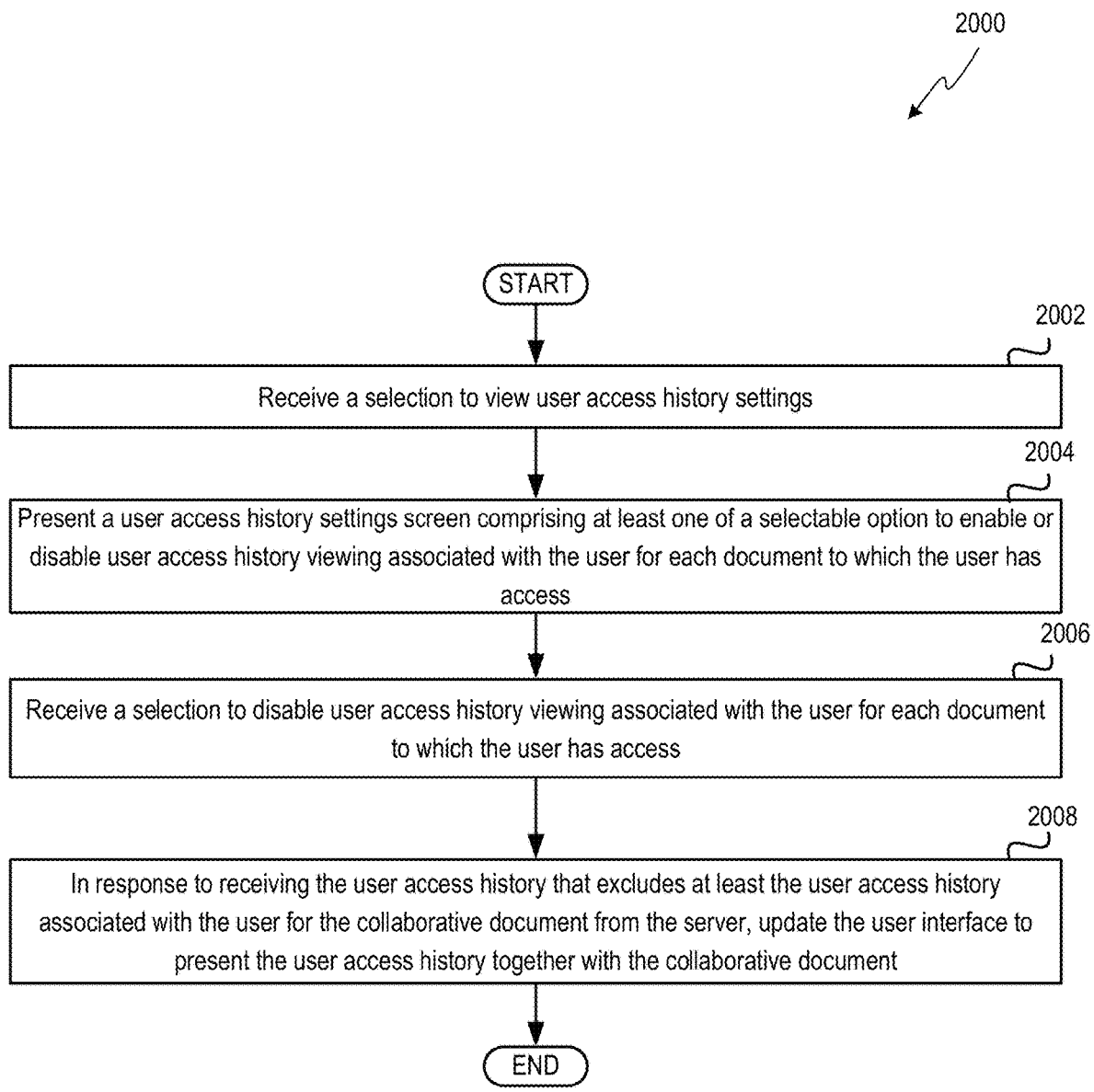
FIG. 20 depicts a flow diagram of aspects of a method for a user device to allow a user to disable user access history viewing for any collaborative document associated with the user, in accordance with one implementation of the disclosure.

FIG. 20 depicts a flow diagram of aspects of a method 2000 for a user device 120A to allow a user to disable user access history viewing for any collaborative document associated with the user, in accordance with one implementation of the disclosure. Method 2000 may be performed in the same or a similar manner as described above in regards to method 300. Also, method 2000 may be performed by processing devices of one or more of the user devices 120A-120Z executing the collaborative document environments 122A-122Z. For purposes of clarity, the user device 120A is referenced throughout the discussion of method 2000.

Method 2000 may begin at block 2002. At block 2002, the processing device may receive a selection to view user access history settings. The selection may be received via a visual indicator (e.g., button, link, graphic, image, etc.) located at any suitable location (e.g., on the canvas of the UI 124A, in a drop-down menu of the UI 124A, on any view presented in the UI 124A, etc.) of the UI 124A presenting the collaborative document 116.

At block 2004, the processing device may present the user access privacy setting view 1600 including at least one of a selectable option (e.g., the first selectable option 1602) to enable or disable the user access history for any collaborative documents to which the user has permission to access (global access history setting). At block 2006, the processing device may receive a selection, via the first selectable option 1602, to disable the user access history viewing associated with the user for each collaborative document to which the user has access. The user device 120A may transmit a request to the server (one or more of servers 112A-112Z) to set the global access history setting 119 to disabled. If the server accepts the change to the global access history setting 119, the global access history setting 119 may be saved in the database 114. As a result, the server may exclude the access history for the user for the collaborative document 116 based on the global access history setting 119. Likewise, if the user access history is requested for any other collaborative document to which the user has permission to access, the server may exclude the access history for the user from those as well based on the disabled global access history setting 119.

At block 2008, the processing device may, in response to receiving the user access history 600 that excludes at least the user access history associated with the user for the collaborative document 116 from the server, display an updated user interface 124A to present the user access history 600 together with the collaborative document 116.

Figure 21:
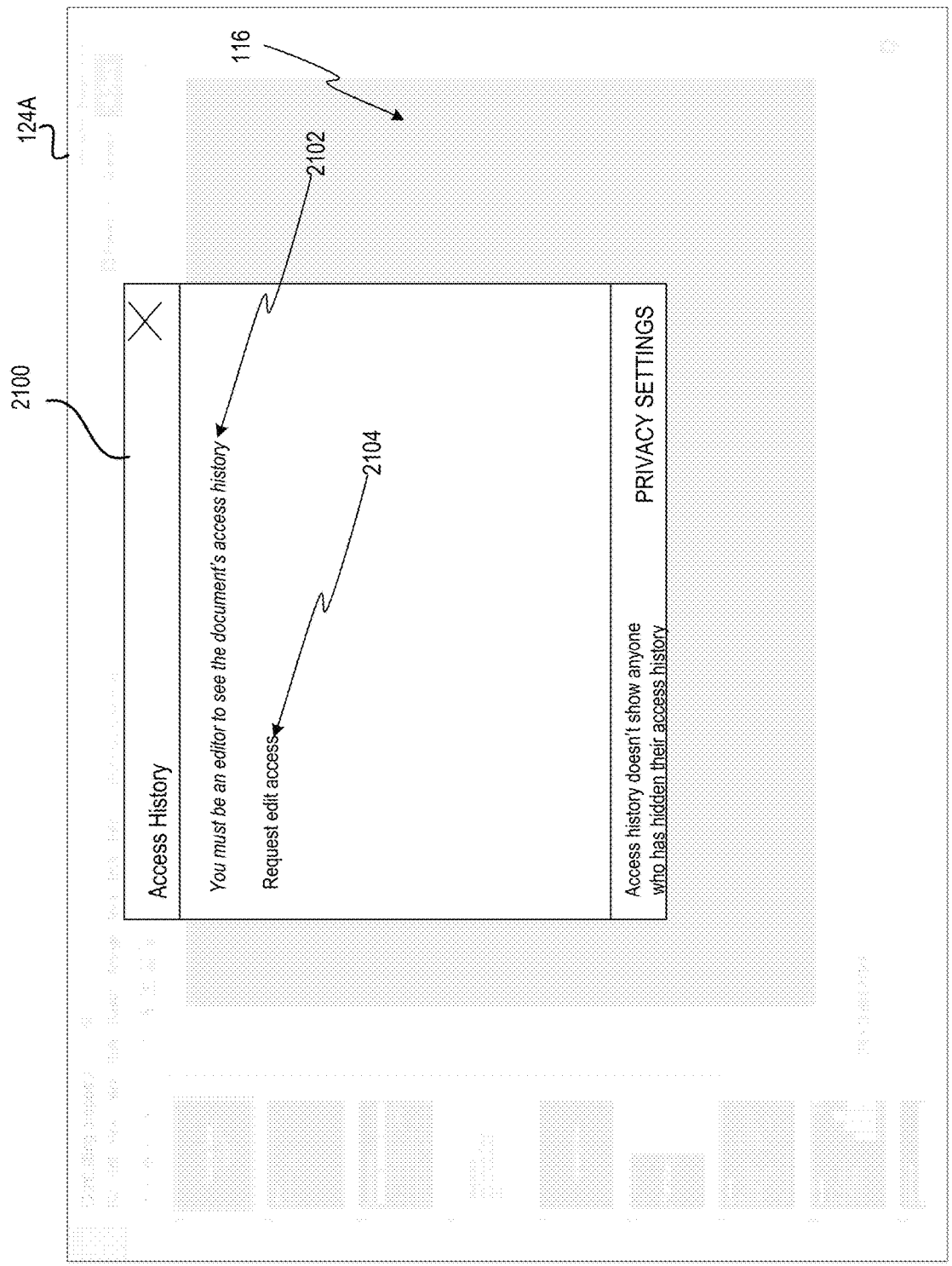
FIG. 21 illustrates an example of a view indicating that non-editors cannot view the user access history for the collaborative document, in accordance with one implementation of the disclosure.

FIG. 21 illustrates an example of a view 2100 indicating that non-editors cannot view the user access history 600 for the collaborative document 116, in accordance with one implementation of the disclosure. The view 2100 may be displayed in the UI 124A presenting the collaborative document 116. The view 2100 may include a message 2102 that indicates that the user cannot view the user access history 600 unless the user has a user type of editor. The view 2100 may be displayed a result of the user selecting a visual indicator representing the user access history 600 in the UI 124A. In an implementation, the view 2100 may also include a link 2104 that enables the user to request the certain user type (e.g., editor) to be able to view the user access history 600.

Figure 22:
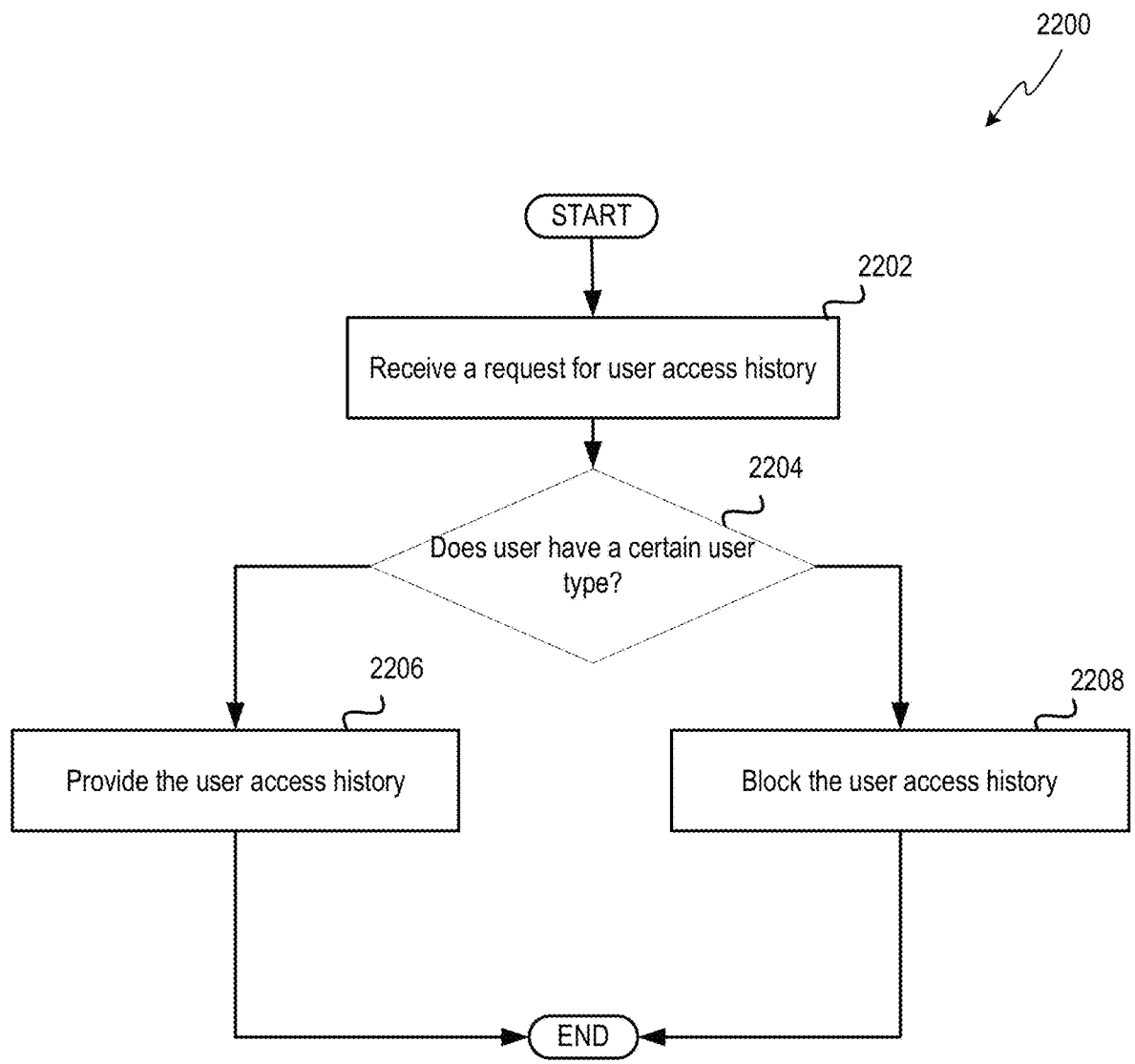
FIG. 22 depicts a flow diagram of aspects of a method for a server determining whether to provide the user access history to a user, in accordance with one implementation of the disclosure.

FIG. 22 depicts a flow diagram of aspects of a method 2200 for a server determining whether to provide the user access history 600 to a user, in accordance with one implementation of the disclosure. Method 2200 may be performed in the same or a similar manner as described above in regards to method 300. Also, method 2200 may be performed by processing devices of one or more of the servers 112A-112Z executing the user access history modules 118A-118Z in the cloud-based environment 110.

Method 2200 may begin at block 2202. At block 2202, the processing device may receive a request for the user access history 600. The request may be received from the user device 120A. At block 2204, the processing device may determine whether the user has a certain user type (e.g., editor with editing permissions). If the user has the certain user type, the processing device may provide (block 2206) the user access history 600. If the user does not have the certain user type (e.g., is a non-editor), the processing device may (block 2208) block the user access history 600 from being sent.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Figure 23:
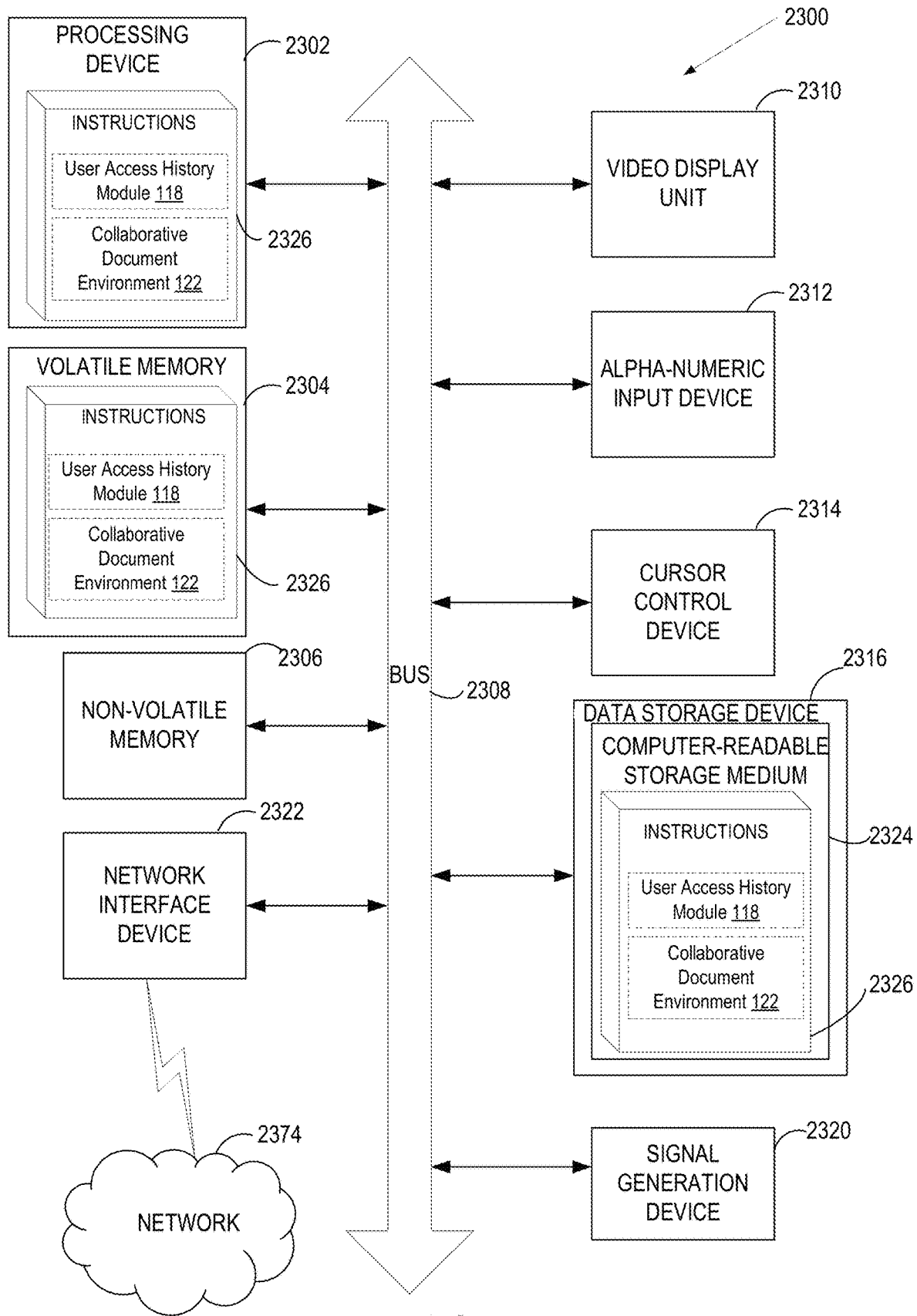
FIG. 23 depicts a block diagram of an example computing system operating in accordance with one or more aspects of the present disclosure.

FIG. 23 depicts a block diagram of an example computing system operating in accordance with one or more aspects of the present disclosure. In various illustrative examples, computer system 2300 may correspond to any of the computing devices within system architecture 100 of FIG. 1. In one implementation, the computer system 2300 may be each of the servers 112A-112Z. In another implementation, the computer system 2300 may be each of the user devices 120A-120Z.

In certain implementations, computer system 2300 may be connected (e.g., via a network, such as a Local Area Network (LAN), an intranet, an extranet, or the Internet) to other computer systems. Computer system 2300 may operate in the capacity of a server or a client computer in a client-server environment, or as a peer computer in a peer-to-peer or distributed network environment. Computer system 2300 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 2300 may include a processing device 2302, a volatile memory 2304 (e.g., random access memory (RAM)), a non-volatile memory 2306 (e.g., read-only memory (ROM) or electrically-erasable programmable ROM (EEPROM)), and a data storage device 2316, which may communicate with each other via a bus 2308.

Processing device 2302 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 2300 may further include a network interface device 2322. Computer system 2300 also may include a video display unit 2310 (e.g., an LCD), an alphanumeric input device 2312 (e.g., a keyboard), a cursor control device 2314 (e.g., a mouse), and a signal generation device 2320.

Data storage device 2316 may include a non-transitory computer-readable storage medium 2324 on which may store instructions 2326 encoding any one or more of the methods or functions described herein, including instructions implementing the user access history module 118 (118A-118Z) of FIG. 1 for implementing methods 300, 800, 1100, 1400, 1800, and 2200 or including instructions implementing collaborative document environment 122 (122A-122Z) of FIG. 1 for implementing methods 900, 1200, 1500, 1900, and 2000.

Instructions 2326 may also reside, completely or partially, within volatile memory 2304 and/or within processing device 2302 during execution thereof by computer system 2300, hence, volatile memory 2304 and processing device 2302 may also constitute machine-readable storage media.

While computer-readable storage medium 2324 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city. ZIP code, or state level), so that a particular location of a user cannot be determined. Thus, the user may have control over what information is collected about the user, how that information is used, and what information is provided to the user.

What is claimed is:

1. A method for providing user access history for a collaborative document, the method comprising:
   receiving, by a server, a first request for the collaborative document concurrently editable by two or more collaborating users of a plurality of collaborating users that have permission to access the collaborative document, the first request being received from a first client device of a first collaborating user of the plurality of collaborating users;
   providing, by the server, the collaborative document concurrently editable by the two or more collaborating users to the first client device for presentation to the first collaborating user in a first user interface on the first client device;
   determining whether a collaborator type of the first collaborating user matches a predefined collaborator type;
   responsive to determining that the collaborator type of the first collaborating user matches the predefined collaborator type:
   identifying, by the server, first user access history information for the collaborative document concurrently editable by the two or more collaborating users based on accesses of the collaborative document by one or more of the plurality of collaborating users, the first user access history information specifying the plurality of collaborating users who have permission to access the collaborative document concurrently editable by the two or more collaborating users, the specified plurality of collaborating users including one or more collaborating users who have not accessed the collaborative document concurrently editable by the two or more collaborating users; and
   providing, by the server, the first user access history information for the collaborative document to the first client device for display within a first consolidated view of the first user interface presenting the collaborative document concurrently editable by the two or more collaborating users, wherein the first consolidated view comprises a list of the plurality of collaborating users that have permission to access the collaborative document, and for each of the plurality of collaborating users in the list, an indication of whether a respective collaborating user accessed the collaborating document;
   receiving, by the server, a second request for the collaborative document from a second client device of a second collaborating user of the plurality of collaborating users that have permission to access the collaborative document; and
   responsive to determining that the collaborator type of the second collaborating user does not match the predefined collaborator type:

providing, by the server, second user access history information for the collaborative document to the second client device for display within a second consolidated view of a second user interface presenting the collaborative document, wherein the second user access history information for the collaborative document is different from the first user access history information for the collaborative document, and wherein at least one of the first user access history information or the second user access history information is provided in response to determining that access history viewing for the collaborative document is enabled for at least a corresponding one of the first user or the second user.

2. The method of claim 1, wherein determining that the collaborator type of the first collaborating user matches the predefined collaborator type comprises determining that the first collaborating user has editing permissions for the collaborative document.

3. The method of claim 1, wherein determining that the collaborator type of the second collaborating user does not match the predefined collaborator type comprises determining that the second collaborating user lacks editing permissions for the collaborative document.

4. The method of claim 1, further comprising:
receiving, from the first client device, a message request comprising a message to be sent to one or more of the plurality of collaborating users identified in the first user access history information in the first user interface; and
transmitting the message to one or more client devices associated with the one or more of the plurality of collaborating users.

5. The method of claim 4, wherein the message request is selected via an indicator on a view including the first user access history information in the first user interface presenting the collaborative document.

6. The method of claim 1, wherein the first user access history information comprises timestamps of most recent viewings of the collaborative document by each of the plurality of collaborating users that accessed the collaborative document.

7. The method of claim 1, wherein the first user access history information for the collaborative document is provided in response to determining that global access history viewing for collaborative documents including the collaborative document is enabled for one or more of the plurality of collaborating users.

8. The method of claim 1, further comprising:
including group metadata that is associated with one or more of the plurality of collaborating users in a group in the first user access history information.

9. The method of claim 1, further comprising:
receiving, at the server, one or more access requests to the collaborative document; and
storing access data for each of the one or more access requests, the access data for each of the one or more access requests comprising an identity of one of the plurality of collaborating users associated with a respective access request and a time at which the respective access request was received.

10. The method of claim 1, wherein providing the first user access history information for the collaborative document to the first client device for display within the first consolidated view of the first user interface presenting the collaborative document comprises:

causing the first user access history information to be displayed in the first consolidated view overlaid on a portion of the collaborative document presented in the first user interface.

11. A system, comprising:
a memory device; and
a processing device coupled to the memory device to:
receive a first request for a collaborative document concurrently editable by two or more collaborating users of a plurality of collaborating users that have permission to access the collaborative document, the first request being received from a first client device of a first collaborating user of the plurality of collaborating users;
provide the collaborative document concurrently editable by the two or more collaborating users to the first client device for presentation to the first collaborating user in a first user interface on the first client device;
determine whether a collaborator type of the first collaborating user matches a predefined collaborator type;
responsive to determining that the collaborator type of the first collaborating user matches the predefined collaborator type:
identify first user access history information for the collaborative document concurrently editable by the two or more collaborating users based on accesses of the collaborative document by one or more of the plurality of collaborating users, the first user access history information specifying the plurality of collaborating users who have permission to access the collaborative document concurrently editable by the two or more collaborating users, the specified plurality of collaborating users including one or more collaborating users who have not accessed the collaborative document concurrently editable by the two or more collaborating users; and
provide the first user access history information for the collaborative document to the first client device for display within a first consolidated view of the first user interface presenting the collaborative document concurrently editable by the two or more collaborating users, wherein the first consolidated view comprises a list of the plurality of collaborating users that have permission to access the collaborative document, and for each of the plurality of collaborating users in the list, an indication of whether a respective collaborating user accessed the collaborating document;
receive a second request for the collaborative document from a second client device of a second collaborating user of the plurality of collaborating users that have permission to access the collaborative document; and
responsive to determining that the collaborator type of the second collaborating user does not match the predefined collaborator type:
provide second user access history information for the collaborative document to the second client device for display within a second consolidated view of a second user interface presenting the collaborative document, wherein the second user access history information for the collaborative document is different from the first user access history information for the collaborative document, and wherein at least one of the first user access history information or the second user access history information is provided in response to determining that access history viewing for the collaborative document is enabled for at least a corresponding one of the first user or the second user.

12. The system of claim 11, wherein to determine that the collaborator type of the first collaborating user matches the predefined collaborator type, the processing device is further to determine that the first collaborating user has editing permissions for the collaborative document.

13. The system of claim 11, wherein to determine that the collaborator type of the second collaborating user does not match the predefined collaborator type, the processing device is further to determine that the second collaborating user lacks editing permissions for the collaborative document.

14. The system of claim 11, wherein the processing device is further to:
receive, from the first client device, a message request comprising a message to be sent to one or more of the plurality of collaborating users identified in the first user access history information in the first user interface; and
transmit the message to one or more client devices associated with the one or more of the plurality of collaborating users.

15. One or more tangible, non-transitory computer-readable media storing instructions that, when executed by one or more processing devices, cause the one or more processing devices to:
receive a first request for a collaborative document concurrently editable by two or more collaborating users of a plurality of collaborating users that have permission to access the collaborative document, the first request being received from a first client device of a first collaborating user of the plurality of collaborating users;
provide the collaborative document concurrently editable by the two or more collaborating users to the first client device for presentation to the first collaborating user in a first user interface on the first client device;
determine whether a collaborator type of the first collaborating user matches a predefined collaborator type;
responsive to determining that the collaborator type of the first collaborating user matches the predefined collaborator type:
identify first user access history information for the collaborative document concurrently editable by the two or more collaborating users based on accesses of the collaborative document by one or more of the plurality of collaborating users, the first user access history information specifying the plurality of collaborating users who have permission to access the collaborative document concurrently editable by the two or more collaborating users, the specified plurality of collaborating users including one or more collaborating users who have not accessed the collaborative document concurrently editable by the two or more collaborating users; and
provide the first user access history information for the collaborative document to the first client device for display within a first consolidated view of the first user interface presenting the collaborative document concurrently editable by the two or more collaborating users, wherein the first consolidated view comprises a list of the plurality of collaborating users that have permission to access the collaborative document, and for each of the plurality of collaborating users in the list, an indication of whether a respective collaborating user accessed the collaborating document;
receive a second request for the collaborative document from a second client device of a second collaborating user of the plurality of collaborating users that have permission to access the collaborative document; and
responsive to determining that the collaborator type of the second collaborating user does not match the predefined collaborator type:
provide second user access history information for the collaborative document to the second client device for display within a second consolidated view of a second user interface presenting the collaborative document, wherein the second user access history information for the collaborative document is different from the first user access history information for the collaborative document, and wherein at least one of the first user access history information or the second user access history information is provided in response to determining that access history viewing for the collaborative document is enabled for at least a corresponding one of the first user or the second user.

16. The non-transitory computer-readable media of claim 15, wherein the one or more processing devices are further to present the first user access history information in the first consolidated view, the first user access history information identifying one or more collaborating users that have access to the collaborative document and including an indication of when the one or more collaborating users most recently accessed the collaborative document.

17. The non-transitory computer-readable media of claim 15, wherein to determine that the collaborator type of the first collaborating user matches the predefined collaborator type, the one or more processing devices are further to determine that the first collaborating user has editing permissions for the collaborative document, and wherein to determine that the collaborator type of the second collaborating user does not match the predefined collaborator type, the one or more processing devices are further to determine that the second collaborating user lacks editing permissions for the collaborative document.

* * * * *